United States Patent
De Atley et al.

(10) Patent No.: US 9,106,411 B2
(45) Date of Patent: Aug. 11, 2015

(54) SECURE ESCROW SERVICE

(71) Applicant: Apple Inc., Cupertino, CA (US)

(72) Inventors: Dallas B. De Atley, San Francisco, CA (US); Jerrold V. Hauck, Windermere, FL (US); Mitchell D. Adler, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/767,847

(22) Filed: Feb. 14, 2013

(65) Prior Publication Data

US 2014/0093084 A1    Apr. 3, 2014

Related U.S. Application Data

(60) Provisional application No. 61/707,996, filed on Sep. 30, 2012.

(51) Int. Cl.
| | |
|---|---|
| *G06F 21/62* | (2013.01) |
| *H04L 9/08* | (2006.01) |
| *G06F 21/00* | (2013.01) |
| *H04L 29/06* | (2006.01) |
| *G06F 17/40* | (2006.01) |

(52) U.S. Cl.
CPC .............. *H04L 9/0861* (2013.01); *G06F 21/00* (2013.01); *H04L 63/0428* (2013.01); *H04L 63/062* (2013.01)

(58) Field of Classification Search
CPC ............ G06F 2221/2141; G06F 21/57; H04L 63/101; H04L 2463/062; H04L 2463/121; H04L 9/08; H04L 9/0894; H04L 2209/76; H04L 9/3236; H04L 2209/16
See application file for complete search history.

(56) References Cited

U.S. PATENT DOCUMENTS

| | | | | |
|---|---|---|---|---|
| 7,958,349 | B2* | 6/2011 | Parkinson | 713/158 |
| 8,359,273 | B2* | 1/2013 | Leleu | 705/59 |
| 2009/0016534 | A1* | 1/2009 | Ortiz Cornet et al. | 380/277 |
| 2011/0072274 | A1* | 3/2011 | Leoutsarakos et al. | 713/182 |
| 2011/0252243 | A1 | 10/2011 | Brouwer et al. | |

FOREIGN PATENT DOCUMENTS

WO  PCT/US2013/049956    7/2013

OTHER PUBLICATIONS iOS Security. Apple. May 2012.*
International Search Report and Written Opinion for PCT/US2013/049956, Oct. 8, 2013 (mailing date), Apple Inc.

* cited by examiner

*Primary Examiner* — Venkat Perungavoor
(74) *Attorney, Agent, or Firm* — Adeli LLP

(57) ABSTRACT

A method of restoring confidential information items of a first device to a second device by using a set of servers. The method generates a public and private key pair and ties the private key to the hash of executable code of the servers at the time of generating the public and private keys. The method receives the encrypted confidential information items in a secure object which is encrypted with a user-specific key and the public key. The method only provides the confidential information to the second device when the second device provides the same user-specific key as the key that encrypts the secure object and the hash of the executable code of the servers at the time of accessing the private key to decrypt the secure object matches the hash of the executable code running on the servers at the time of generating the private key.

26 Claims, 20 Drawing Sheets

SECURE ESCROW SERVICE

CLAIM OF BENEFIT TO PRIOR APPLICATIONS

This Application claims the benefit of U.S. Provisional Patent Application 61/707,996, entitled "Secure Escrow Service," filed Sep. 30, 2012. U.S. Provisional application 61/707,996 is incorporated herein by reference.

BACKGROUND

Some electronic devices consolidate various types of confidential information such as passwords, account numbers, credit card numbers, personal identification numbers for bank accounts, private keys, etc., in one place referred to as a keychain and make them accessible through a master password. The passwords stored in a keychain include passwords for websites, e-mail accounts, file transfer protocol (FTP) servers, wireless networks, encrypted disk images, private keys, certificates, secure notes, etc.

Some electronic devices provide a default keychain, which is unlocked on login by the user's login password. The user can change the password to add security at the expense of the additional steps required to enter the password. When a user accesses any keychain-aware application, the keychain provides the password so the user does not have to type the password. A user can create different keychains to store passwords and confidential information for different purposes, e.g., one for work, one for school, and one for online shopping.

In order to protect the confidential information in a keychain, the keychain or each item in the keychain is encrypted with a key sometimes referred to as class keys. The class keys are then stored in a data structure referred to as a keybag. The keybag can be backed up at a remote storage location such as another computer or on a network such as the Internet. The backup copy can be used to restore the keybag to the device. To maximize the protection of the keybag, the backed up keybag for each device is also encrypted with a unique device identifier (UID) such as advanced encryption standard (AES) key of the device prior to being backed up in the storage outside the device. This protects the keybag of a device to be stolen and used on another device.

FIG. 1 illustrates a system that backs up the keybag of a user device according to prior art. As shown, the keybag (or an encrypted keybag) of user device 1 105 is further encrypted by the UID of device 1 (UID 1) and is sent (as shown by encircled 1) to network 115 for storage in the network storage 120. When user device 1 105 requires retrieving the encrypted keybag, the keybag is sent (as shown by encircled 2) to user device 1 105. User device 1 105 uses its own UID (UID 1) to decrypt the keybag.

As often happens, electronic devices are lost, stolen, or are simply replaced. It is desirable to restore the keybag of a user from one electronic device to another electronic device. However, since the keybag of user device 1 is encrypted with the UID of user device 1, the keybag cannot be decrypted (as shown by encircled 3) by user device 2 110 which has a different UID (UID 2) and does not have access to the UID of device 1.

BRIEF SUMMARY

In some embodiments, each item in a device keychain is encrypted with a class key. The class keys are stored in a structure referred to as a keybag. The keybag and the keychain of a first device are backed up in network storage and are restored to a second device only when the second device is properly authenticated. The keybag and/or the keychain are encrypted by a recovery key and stored in network storage. The recovery key in some embodiments is a strong key that is generated at the time of the device set up.

The recovery key is then encrypted by using an escrow key to create a recovery binary large object (blob). The escrow key is generated based on one or more user-specific information items known to the user of the device. The user-specific information items include one or more items such as username, password, and answer to secret questions that are provided by the user.

The recovery blob is then encrypted by a public key of a set of highly secure servers to create an escrow blob. The escrow blob is then sent to the network for backup storage. When a second device requests to retrieve the backed up keybag or keychain, the recovery key is sent to the requesting device only when the requesting device is properly authenticated. The network sends the escrow blob (that contains the recovery blob) to the set of highly secure servers that have the private key corresponding to the public key that encrypts the recovery blob.

The secure servers then use their private key to decrypt the escrow blob. In order to ensure that the secure servers are not tampered with, when the public and private keys are generated by the secure servers, the hash of the executable code of the secure servers is tied to the private key for access control. When the secure servers attempt to use the private key at a later time to decrypt the escrow blob, the private key becomes inaccessible if the hash of the executable code of the secure servers at that time does not match the hash of the executable code when the public and private keys were generated.

In addition, the secure servers operate in groups that cannot exceed a maximum number and processing the requests from each device is always assigned to a particular group of secure servers. Assigning each user device to a particular group of secure servers and setting a maximum number for the secure servers prevents duplicating the secure servers to make a brute force attempt to decrypt the escrow blob to get the recovery blob.

Once the escrow blob is decrypted by using the private key, the secure servers request the second device to provide the escrow key to decrypt the recovery blob. The device asks the user to provide the user-specific information that was used to generate the escrow key for the first device. If the user of the second device provides the right answers, the secure servers can use the resulting escrow key to decrypt the recovery blob to get the recovery key. The recovery key is sent to the second device to restore the keychain of the first device to the second device. However, if the escrow key is invalid, the secure servers allow a predetermined number of retries in some embodiments. If the user does not provide the right answers after the predetermined number of reties, the recovery blob is irrevocably locked in some embodiments. In other embodiments, the secure servers start a timeout that geometrically increases after each failed attempt in order to prevent brute force attempts to try different escrow keys by a malicious device.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

In order to protect the confidential information, the keychain is encrypted on the user device. Different embodiments provide different protections for the keychain. In some embodiments, each item in a keychain is encrypted with a class key. In these embodiments, each confidential information item in a keychain is classified to belong to a particular class and is encrypted with the key for the particular class. The collection of class keys is referred to as a keybag. In some embodiments, some or all class keys are device-dependent. In some embodiments, a random item key is generated for each password in the keychain. The item key is a strong encryption key such as an advanced encryption standard (AES) 128 bit or 192 bit or 256 bit encryption key. The item key is used to encrypt the corresponding password. The encrypted password is then further encrypted with the class key.

Figure 1:
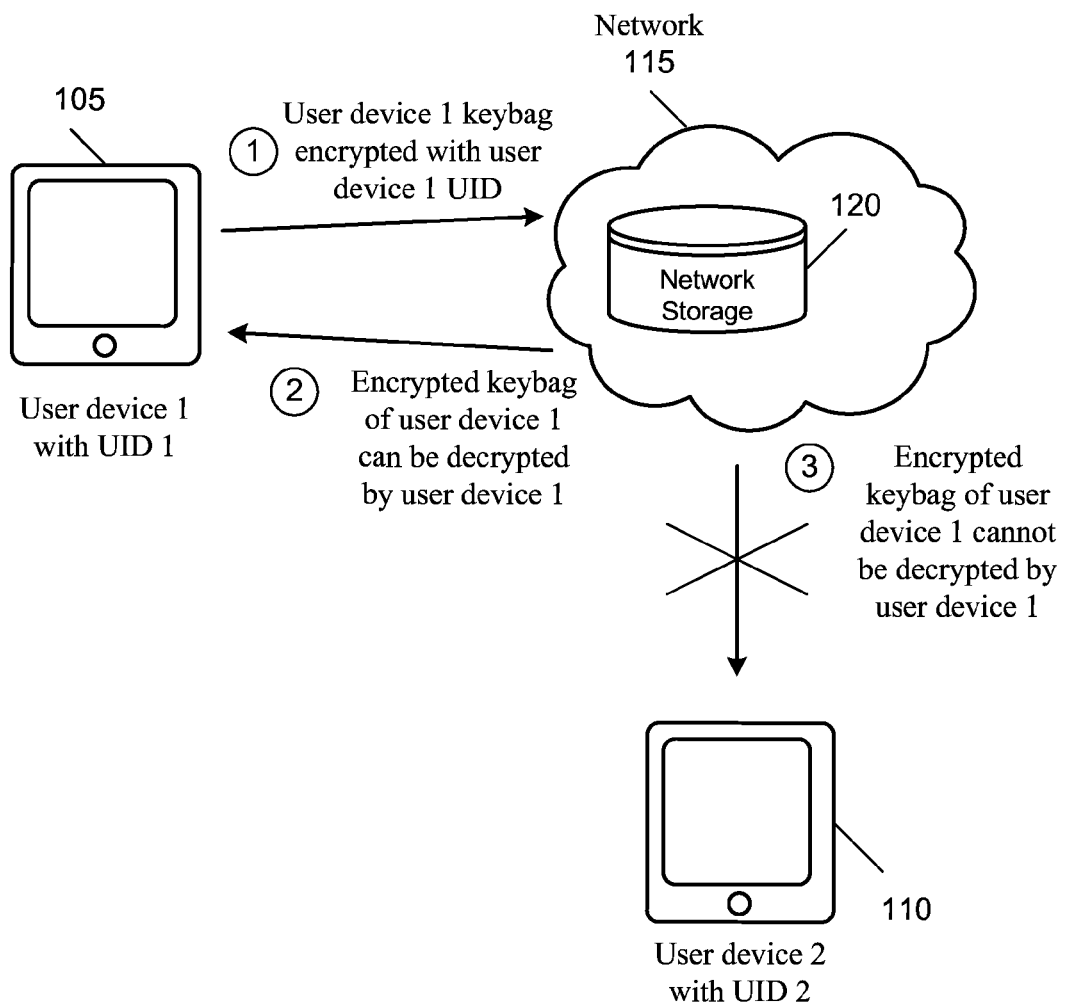
FIG. 1 illustrates a system that backs up the keybag of a user device according to prior art.
Figure 2:
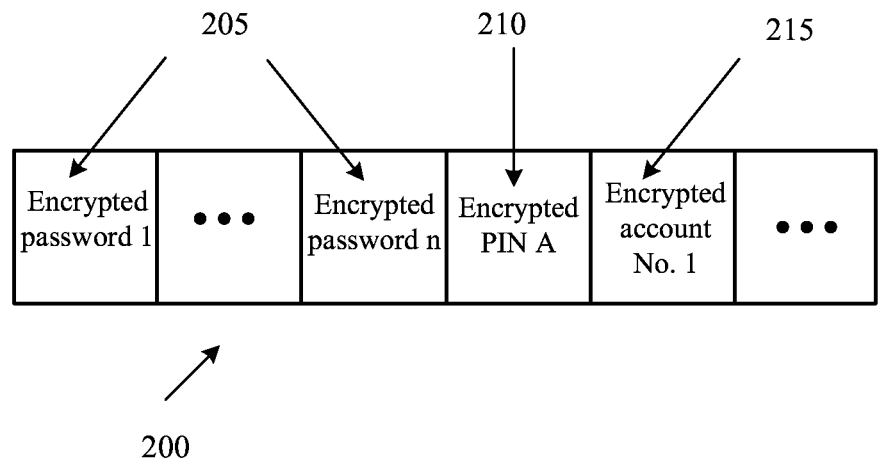
FIG. 2 illustrates an example of a keychain used in an electronic device.

FIG. 2 illustrates an example of a keychain 200 used in an electronic device. As shown, the keychain in this example stores several encrypted passwords 205, a PIN 210, and an account number 215. As described above, in some embodiments each password in the keychain is encrypted with a class key. In other embodiments, each password is first encrypted with an item key and then with a class key.

Figure 3:
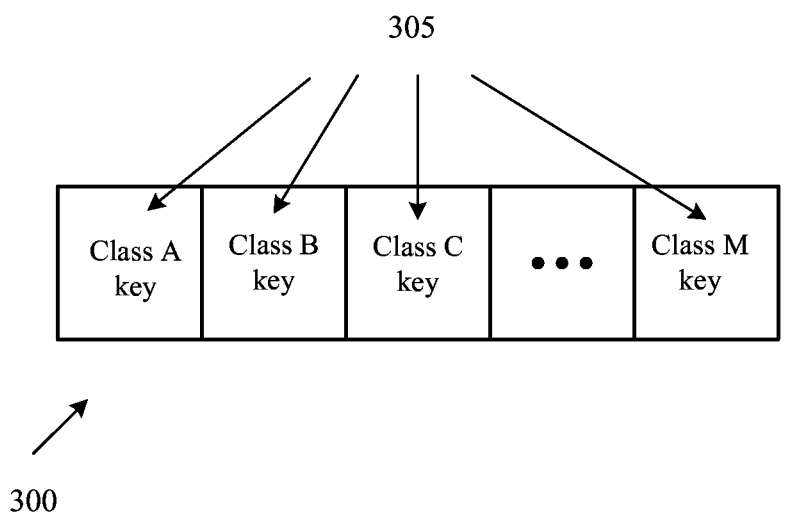
FIG. 3 illustrates an example of a keybag used in an electronic device.

FIG. 3 illustrates an example of a keybag 300 used in an electronic device. As shown, the keybag includes the class keys 305 which are used to encrypt and decrypt confidential information in the keychain 200.

The keychain and the keybag are encrypted and backed up at a remote storage location such as another computer or on a network such as the Internet. The backup copies are used to restore the keychain or the keybag to the device. Some embodiments provide a mechanism to back up the keybag and keychain of a user device and retrieve them to another device after ensuring that the two devices belong to the same user.

In this Specification several embodiments of the invention are described by referencing both keychains and keybags. As described above, a keybag is a collection of class keys that are used to encrypt confidential items in a keychain. The embodiments of the invention, however, are not limited to or require using a keybag or encrypting every password in the keychain with a class key. For instance, the whole keychain in some embodiments is encrypted with an individual key. For these embodiments, any reference to a keybag should be understood to be referring to this individual key.

In addition, several embodiments are described below where the keybag is encrypted with a recovery key that is e.g., generated during the device set up. The encrypted keybag is then stored in network storage outside the device. In order to protect the recovery key, the recovery key is encrypted with an escrow key to create a recovery object or recovery binary large object (blob). The recovery blob is encrypted with the public key of a set of secured servers to generate an escrow blob (or escrow object), which is stored in network storage. The term escrow blob or escrow object is used in some of the following examples to refer to the encrypted data that is saved on the network storage to protect the key that encrypts the device confidential information such as the keybag. Using such a recovery key is, however, not the only way of protecting a keybag. In some embodiments, the keybag is stored in the network storage by using a backup password that is received from the user through a user interface. Also, as discussed above, the keybag can be protected with a hardware specific key. In some embodiments, the escrow key is replaced by an escrow password. For example, the escrow object would then be a combination of the recovery key and a recovery/escrow password, and the combination would be encrypted to the HSM's public key.

Figure 4:
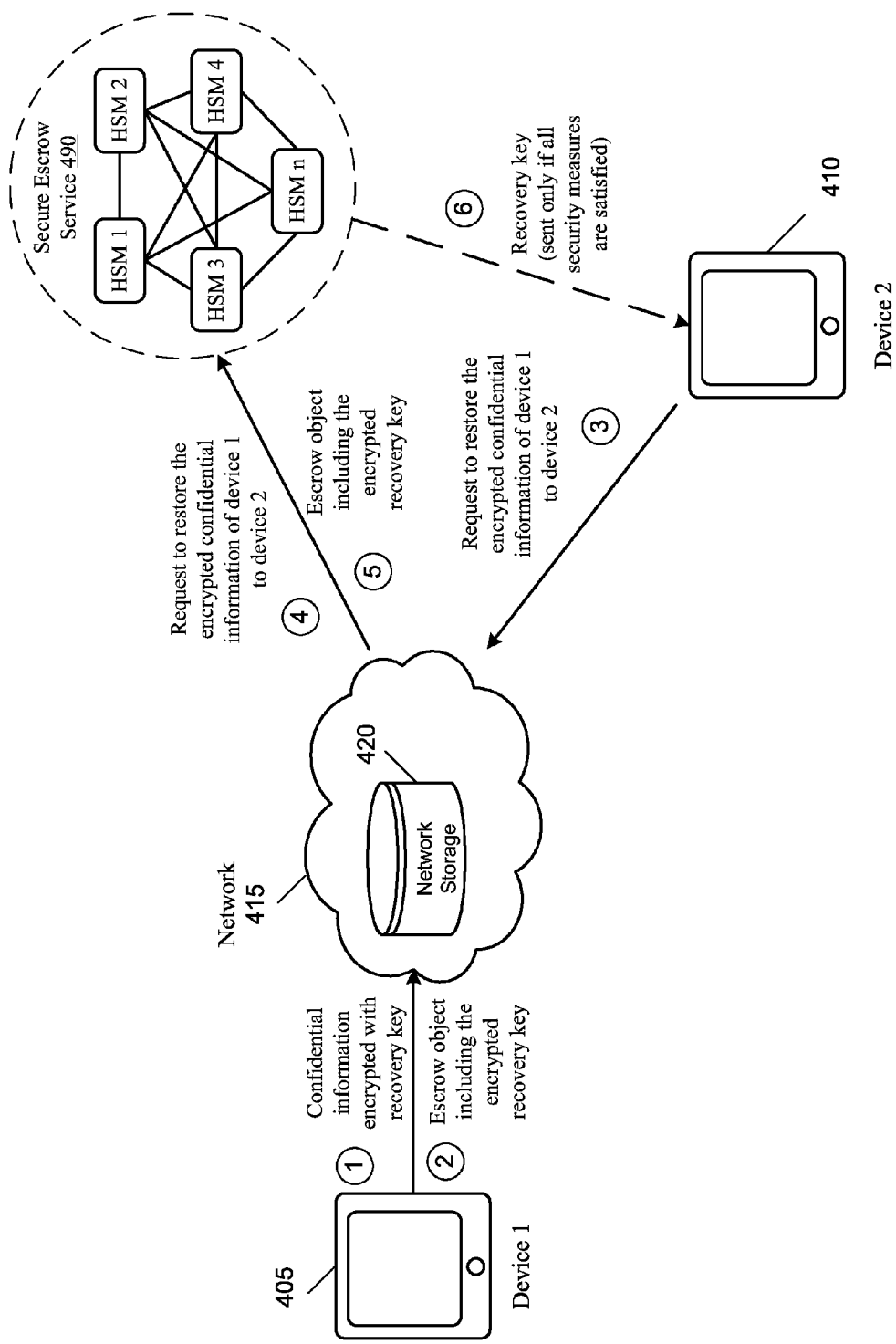
FIG. 4 conceptually illustrates a high-level diagram of a system for backing up the confidential information of a device and retrieving the confidential information for a different device in some embodiments of the invention.

FIG. 4 conceptually illustrates a high-level diagram of a system for backing up the confidential information of a device and retrieving the confidential information for a different device in some embodiments of the invention. As shown, the encrypted confidential information of device 1 405 is sent (as shown by encircled 1) to network 415 for back up to network storage 420. The encrypted confidential information includes, e.g., the keybag that is encrypted with a strong recovery key. The recovery key is also encrypted with a user-specific escrow key and a private key of a set of secure servers 490 to generate an escrow blob (escrow object) and stored in the network storage 420 (as shown by the encircled 2).

The network 415 receives (as shown by encircled 3) a request at a later time to restore the confidential information of device 1 405 to device 2 410. For instance, the user of device 1 may have purchased device 2 410 (e.g., when device 1 is lost or being replaced) and wishes to restore the keychain of the device 1 405 to the new device. On the other hand, device 2 might belong to a malicious user who is trying to gain access to the confidential information of device 1 in order to use the passwords and other confidential information of device 1. There is therefore a need to prevent access to the confidential information of device 1 without authorization of the user of device 1.

In order to authenticate device 2, the network 415 forwards (as shown by encircled 4) the request along with the escrow object (as shown by the encircled 5) to the set of secure servers 490. As described in the following sub-sections, the set of secure servers (the secure escrow service) utilizes several security measures to ensure the safe recovery of the confidential information of a device by another device. The escrow object is decrypted and the recovery key is sent (as shown by encircled 6) to device 2 only if several security measures are satisfied and user device 2 is authenticated. After user device 2 receives the recovery key, the recovery key is used to decrypt the encrypted keybag, which is separately received by user device 2. Details of these operations are described in the following sections. Although several examples are described in this disclosure where the escrow object is created, stored, and decrypted in order to protect the recovery key, one of ordinary skill in the art would realize that the same techniques disclosed herein are applicable for protecting other types of keys and confidential information.

I. Security Measurements for Backing up Confidential Information of a Device outside the Device A. Keychain is Safe when User Credentials are Compromised There is a thriving black market industry where people try to discover usernames and passwords stored in remote network storages so that they can then build a database of accounts and passwords and sell them. One reason that the black market is successful is that the passwords are usually weak and easy to guess. People tend to re-use passwords among different services so if the password to one service is compromised, there's a good chance that the same password can be used for other applications.

Therefore, some embodiments of the invention do not rely solely on the user credentials (e.g., a username and password) that are used to access network storage to secure the backed up payload (e.g., the keychain or keybag). In these embodiments, the payload is encrypted with a strong key prior to being backed up in the network storage. Even though one can guess and compromise the username and password for retrieving data backed up on network storage, the retrieved payload is encrypted with a strong key.

Encrypting the payload with a key that is not based on usernames and passwords also makes the keys scalable. For instance, as the technology for trying brute force attacks improves, longer keys are required to protect data. In a scalable system, the keys can be made stronger by increasing the number of bits in the keys from e.g., 128 bits to 256 bits. It is understood that such an upgrade may require re-encrypting the confidential information and validating them with the users. Details of the encryption of the payload prior to being backed up in the network storage are described in "Generation and encryption of keychain in a user device" section below.

B. Keychain or Keybag is Safe when the Network Storage is Compromised

In some embodiments, the network applies rate limiting to limit the number of passwords that can be tried for a user account. For instance, when wrong password is repeatedly received for a username, the network does not allow retries for a certain period of time in some embodiments. The network in some embodiments, notifies the owner of the account that several unsuccessful tries have been made to access the user account. In other embodiments, the network increases the amount of timeout after each try in order to make it time prohibitive to keep on trying different passwords.

However, if the network itself is compromised (e.g., by an insider or by a remote intruder), an intruder might get control of the network software and attempt to repeatedly try different passwords in order to gain access to users account in the network. As shown in FIG. 4, when the network 415 receives the request to restore the payload of confidential information of device 1 405 to device 2 410, the network does not (and as described below cannot) decrypt the escrow object to get to the recovery key. Instead, the network forwards the request along with the escrow object to a set of highly secure servers 490 which have one of the keys needed to decrypt the escrow object. As described below, the escrow object is encrypted with a strong public key that is generated by these servers 490. The network is, therefore, not capable of decrypting the escrow object as the private key that decrypts the escrow object is not known to the network. The servers 490 act as a secure escrow service and decrypt the escrow object and deliver the recovery key to the requesting device upon successful authentication of the device 2.

Some embodiments of the invention provide protection against the network being compromised by performing escrow object decryption as well as authentication of the requesting user device by a set of separate servers with highly secured hardware security modules (HSMs) 490. These HSMs in some embodiments are located in a secured and controlled environment. Each HSM is a physical device capable of asymmetric cryptography and providing asymmetric cryptography. In some embodiments, the HSMs perform cryptography by using asymmetric public/private key pairs. The HSMs create a public/private key pair and send the public key to the user devices to encrypt their recovery keys. The private key is stored locally and is used to decrypt the escrow object received from the network storage prior to sending the recovery key to a user device that is requesting to recover the backed up confidential information. The HSMs in some embodiments are clustered together in groups or pods for redundancy and high availability.

As described further below, the recovery key is also encrypted with an escrow key which is generated based on username, password, and answer to one or more secret questions that are asked from the user of device 1 405. The HSMs in some embodiments request device 2 410 to create an escrow key based on the username, password, and answer to the same questions as were used to generate the escrow key. If the escrow key provided by device 2 410 can decrypt the encrypted recovery key, the user of device 2 knows the same username, password, and answer to secret questions as user of device 1. The HSMs, therefore, trust user device 2 and send the recovery key to device 2 to decrypt and restore e.g., the keybag of device 1 to device 2. Otherwise, the HSMs allow a predetermined number of retries (e.g., 2, 5, 10, etc.). Each time the user provides correct answers and the resulting escrow key can decrypt the encrypted recovery key, the number of attempted retries is reset to zero. In some embodiments, after the number of failed retries reaches the predetermined number, the escrow record becomes irrevocably locked. In other embodiments, the HSMs use a rate limiting with geometric back off process to prevent a malicious user to keep on trying to generate different escrow keys. Details of sending the encrypted recovery key from the network to the HSM for decryption and device authentication are described in "Storing confidential information of a first device and retrieving the confidential information for a second device" section below.

Figure 12:
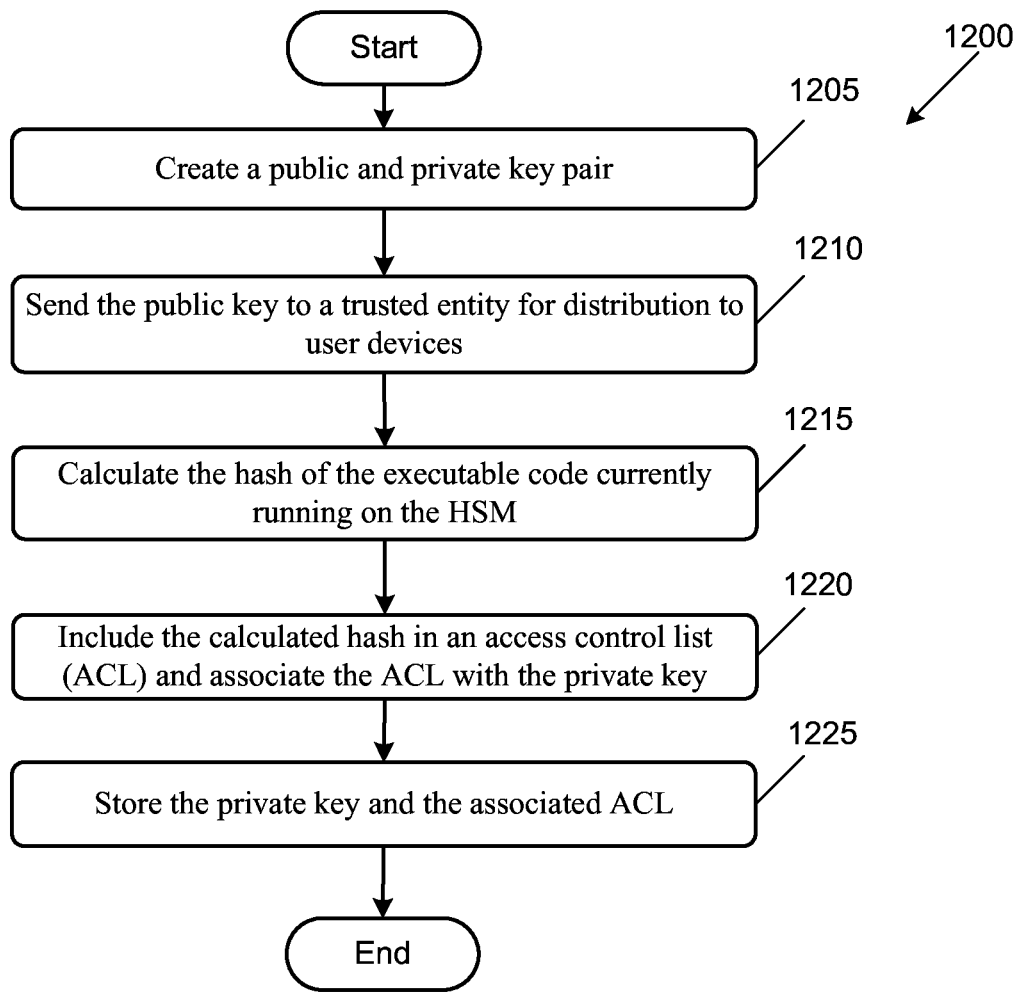
FIG. 12 conceptually illustrates a process for creating a public and private key pair by the secure escrow service in some embodiments of the invention.

In some embodiments, the HSMs, at the time of forming a pod, produce their own certificate. For example, a single public/private key pair might be used as the Secure Escrow Service (SES) Certificate Authority (CA). That private key of some embodiments is setup by the process and operations of FIGS. 12 and 13 described below. The private key is bound to a particular version of the HSM executable code, and the public key is sent to an outside trusted entity (e.g., a root/anchor CA). Here, each time an individual pod forms, the N members of the pod work together to generate a public/private key pair known only to the specific pod. Thereafter, the pod certifies the public pod key using the SES CA key. Thus, at the time the pod is formed, there is no need to send each and every pod public key to an external trusted entity for any form of certification. Only the certification of the initial CA key (and therefore the specific HSM executable code) needs to be done.

C. Keychain is Safe when Secure Escrow Servers are Compromised

In some embodiments, each group or pod of several HSMs is assigned to process requests for a particular group of devices where a request from the same device is always processed by the same pod of HSMs. Some embodiments ensure that even when the HSMs are compromised, the keybag is safe. For instance, a malicious user might take over the HSMs and attempt to bypass the rate limiting process. Alternatively, when a pod of HSMs is running in a foreign country, a governmental entity might come with a subpoena and request the HSM software to be modified to bypass (or turn off) the maximum number of retries or the rate limiting and geometric back off features.

In order to prevent HSM executable code to be compromised, some embodiments generate the public and private key used by HSMs and tie the private key to the hash of the particular version of the executable code that runs on the HSMs when the keys are generated. As described further below, when the HSMs attempt to decrypt the escrow object, the private key used for decryption is only accessible if the hash of the executable code that runs on the HSMs when the recovery key is being decrypted is the same as the hash of the HSM executable code when the public/private key pair was generated.

Accordingly, even when the software that runs on the HSMs is modified to bypass the rate limiting feature (or the software is modified for any other reasons) the hash value of the modified code would not match the hash of the code when the keys were generated. The private key would not be accessible and the escrow object cannot be decrypted to get to the recovery key. Details of securing the HSM executable code are described in "Ensuring the secure escrow servers are not compromised" section below.

In several of the example described above, each HSM is a physical device capable of asymmetric cryptography and providing asymmetric cryptography. However, the HSM of some embodiments does not exclusively use asymmetric cryptography. As an example, this section C describes tying the hash of the executable code to permission to use the private asymmetric key. Instead of such operation, for performance reasons, the HSM may take the original escrow blob on initial receipt, decrypt it with the HSM private key, and re-encrypt to a symmetric key shared among the HSMs in the pod. In some embodiments, that symmetric key would be tied to the hash of the executable code as well.

D. Keychain is Safe when HSM Pods are Duplicated

Since modifying HSM executable code makes the private key that is needed to decrypt the escrow object inaccessible, an entity such as a foreign government with subpoena power and large amount resources might attempt to buy a large number of HSMs and try by brute force to use different private keys to decrypt the escrow object. This is obviously cost-prohibitive. However, some embodiments utilize a novel method to prevent such duplication of resources in order to have access to a device's confidential information.

As described above, in some embodiments HSMs operate in groups or pods, which provide the ability to provide redundancy and allow for one HSM to be taken offline for repairs while other HSMs in the pod continue to process requests from devices that are assigned to them. In these embodiments, the HSMs in a pod of n HSMs recognize each other using cryptography and agree that they never allow more than n simultaneous active members in the pod. For instance, the HSMs in a pod generate a key that they share among themselves. This key is also tied to the hash of the executable code of the HSMs. Therefore, if the code is changed to increase the number of HSMs in the pod, the hash of the executable code changes and the key that is shared among the HSMs becomes inaccessible. Details of ensuring that the keybag is safe when HSM pods are duplicated are described in "Ensuring the secure escrow servers are not compromised" section below.

Several more detailed embodiments of the invention are described in sections below. Section II describes generation and encryption of keychains in a user device in some embodiments. Next, Section III describes storing confidential information of a device outside the device in some embodiments. Section IV then describes how the confidential information of a first device is retrieved for a second device in some embodiments. Section V describes how some embodiments ensure that a set of secured servers are not compromised. Finally, a description of an electronic system with which some embodiments of the invention are implemented is provided in Section VI.

II. Generation and Encryption of Keychain in a User Device

Figure 5:
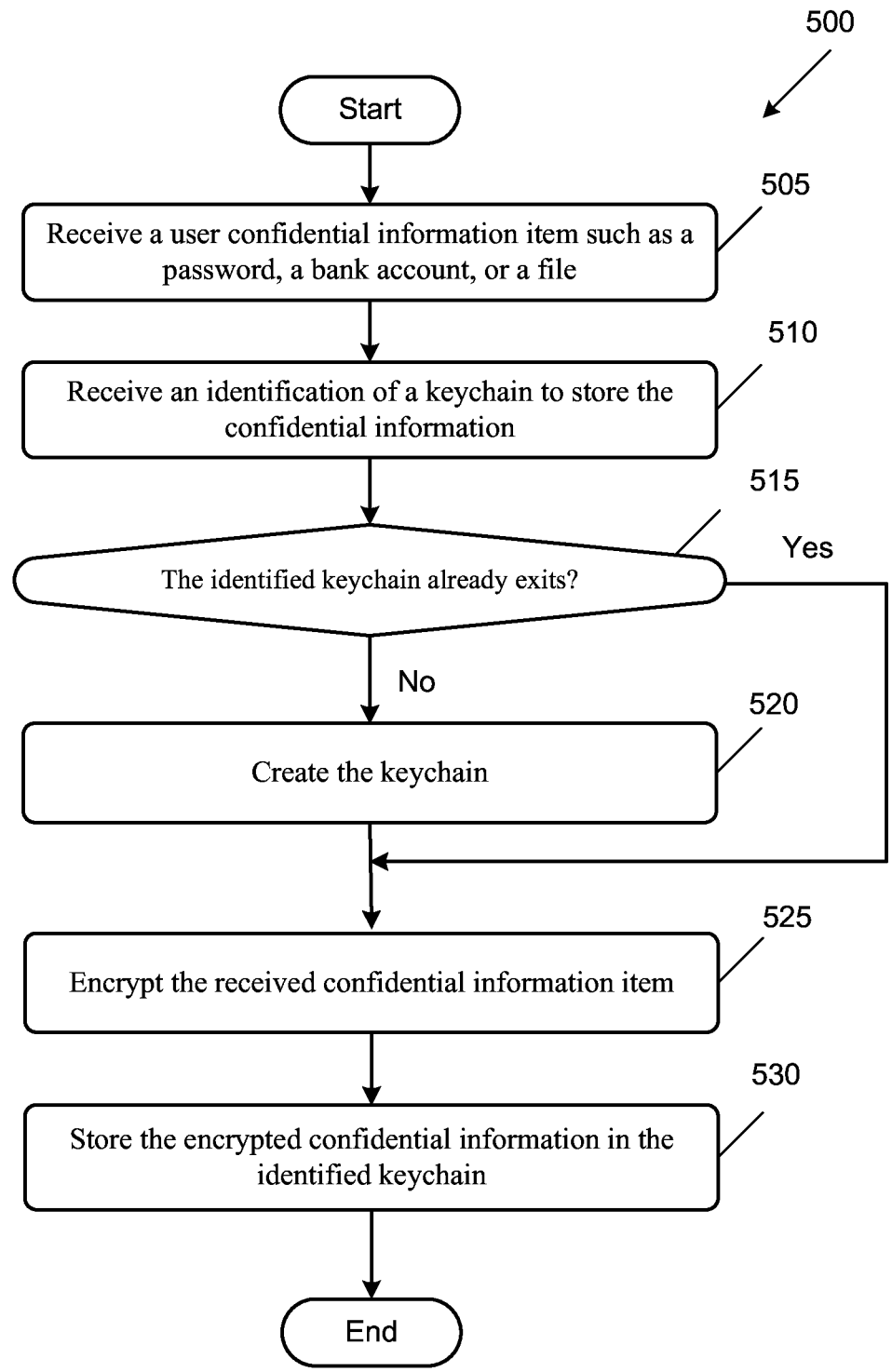
FIG. 5 conceptually illustrates a process for generating a keychain in some embodiments of the invention.

FIG. 5 conceptually illustrates a process 500 for generating a keychain in some embodiments of the invention. As shown, process 500 receives (at 505) a user confidential information item for storing in a keychain. The user confidential information include passwords (e.g., for websites, e-mail accounts, FTP servers, wireless networks, encrypted disk images, private keys, certificates, secure notes, etc.), account numbers, credit card numbers, personal identification numbers for bank accounts, private keys, etc.

Process 500 then receives (at 510) an identification of a keychain. The process determines (at 515) whether the identified keychain exits. If yes, the process proceeds to 525 which is described below. Otherwise, the process creates (at 520) the keychain. The process then encrypts (at 525) the received confidential information item. Some embodiments randomly generate an item key for the confidential item and encrypt the confidential item with the item key. In some embodiments, each confidential information item corresponds to a class in a set of classes. For instance, in some embodiments confidential information that are available only when a device is unlocked and confidential information that are available even when the device is locked belong to different classes. In these embodiments, each confidential information item (or the confidential information item that is encrypted with an item key) is encrypted with the corresponding class key. Process 500 then stores (at 530) the encrypted confidential information in the keychain. The process then exits. In some embodiments a set of attributes corresponding to the confidential item is also stored in the keychain. For instance, the attributes for an Internet password can include security domain, protocol type, and path. In some embodiments, each item stored in the keychain has an associated access control list (ACL) that indicates operations that can be done on the item (e.g., decrypting or authenticating) as well as a list of trusted applications that are allowed to perform those operations on the item without authorization from the user.

Figure 6:
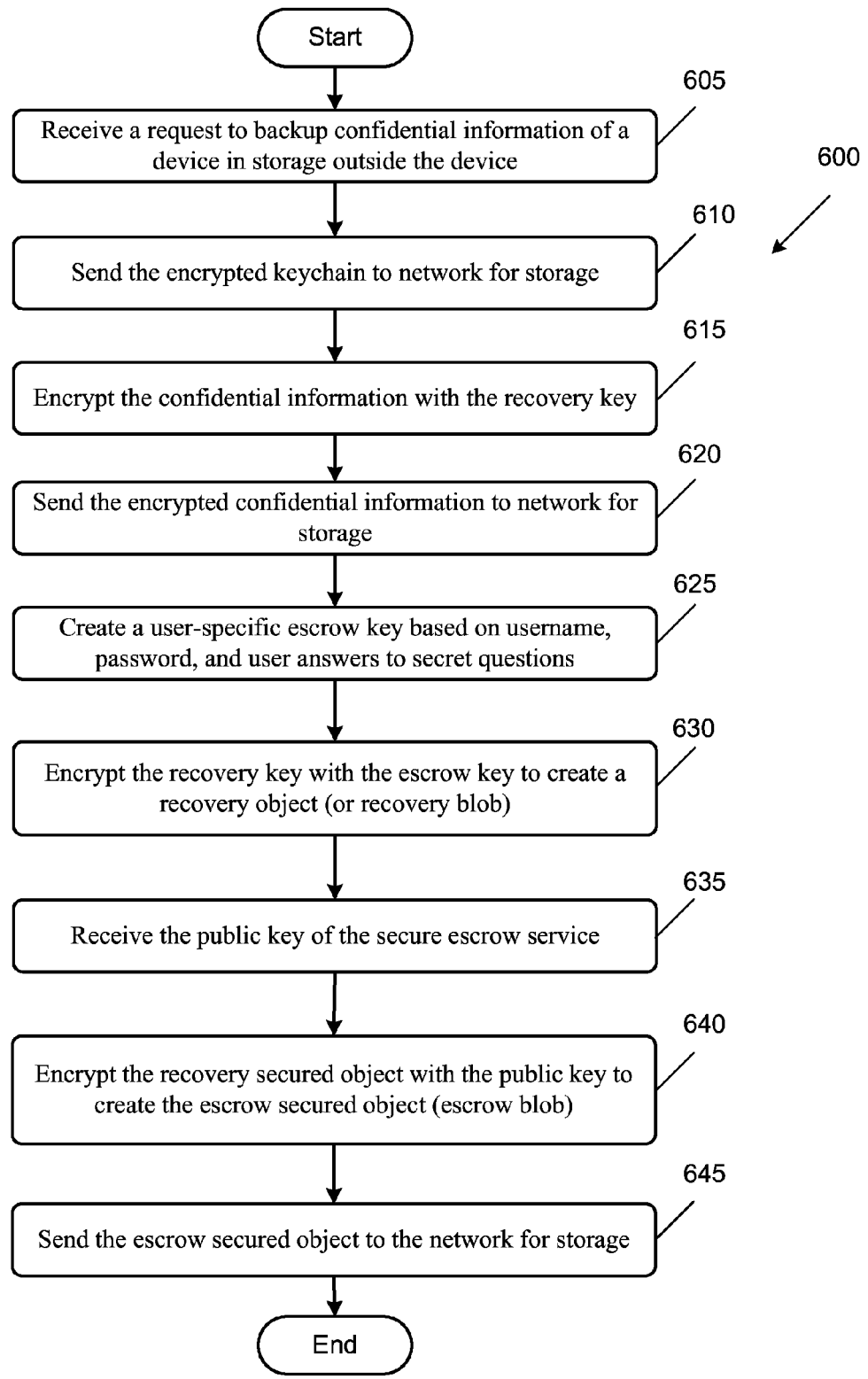
FIG. 6 conceptually illustrates a process for backing up the confidential information of a device in some embodiments of the invention.

FIG. 6 conceptually illustrates a process 600 for backing up confidential information of a device in some embodiments of the invention. As shown, the process receives (at 605) a request to back up the confidential information outside the device. The process sends (at 610) the encrypted keychain to the network for storage. As described above, in some embodiments, some or all items in the keychain are individually encrypted with strong keys (e.g., with class keys and/or item keys). The process also encrypts (at 615) the keybag (which includes the class keys) with a recovery key. The process then sends (at 620) the encrypted keybag to the network for storage.

The process then creates (at 625) an escrow key based on one or more user-specific information items known to the user. The user-specific information items include one or more items such as username, password, and answer to secret questions that are provided by the user.

The process then encrypts (at 630) the recovery key with the escrow key to create a recovery object, also referred to herein as the recovery binary large object (blob). The process then receives (at 635) the public key of the secure escrow service. The process then encrypts (at 640) the recovery object with the public key to create the escrow object (or escrow blob). The process then sends (at 645) the escrow object to the network for storage. The process then exits.

Figure 7:
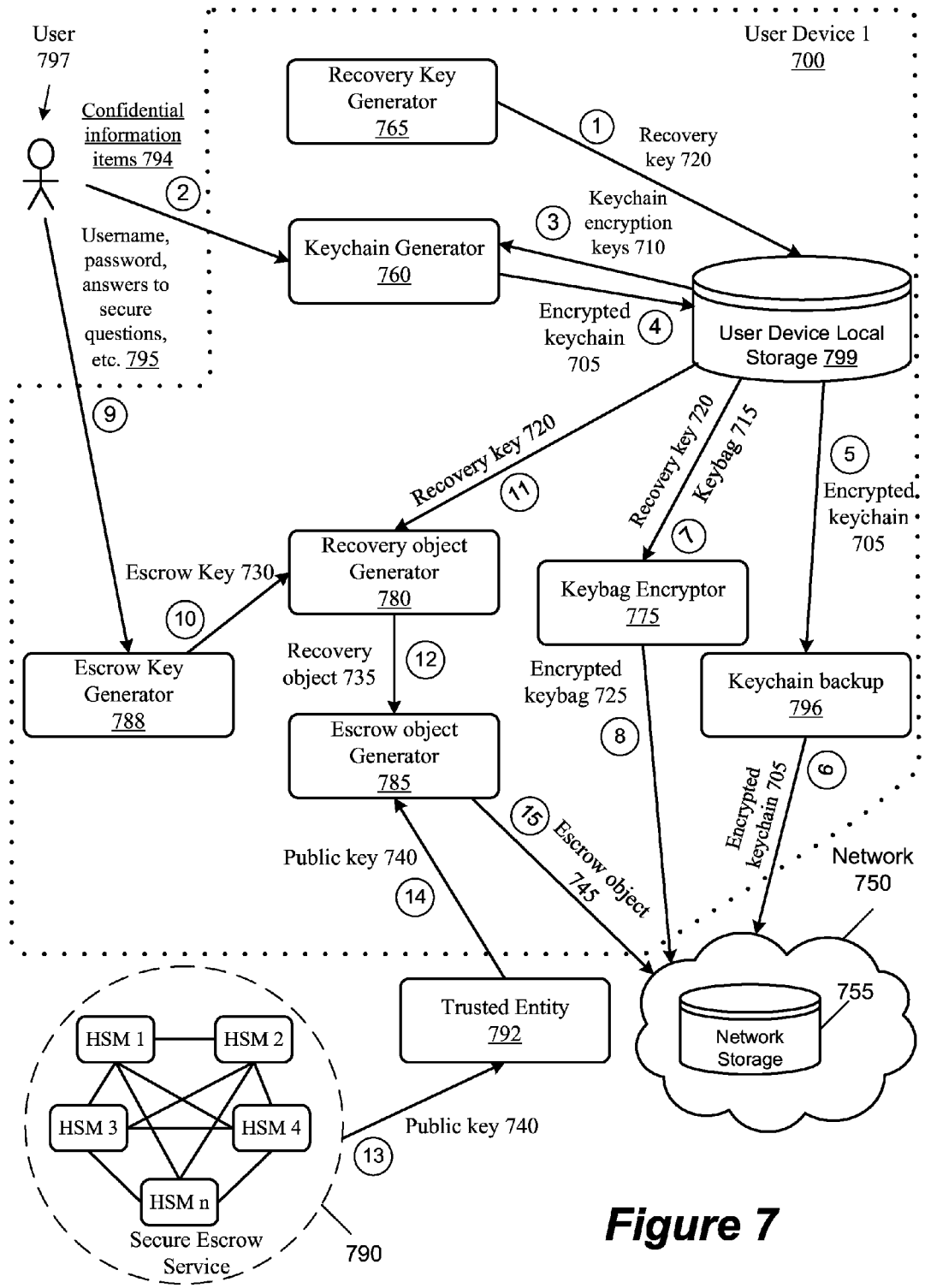
FIG. 7 conceptually illustrates a system for creating and backing up confidential information of a user device in some embodiments of the invention.

FIG. 7 conceptually illustrates a system for creating and backing up confidential information of a user device in some embodiments of the invention. In some embodiments, the system in FIG. 7 utilizes process 500 (which was described by reference to FIG. 5 above) to create keychains and process 600 (which was described by reference to FIG. 6 above) to encrypt the confidential information and send the encrypted information for backup outside the user device. The figure only shows the modules that are used to create and backup the keychain and its associated keys (e.g., class keys stored in the keybag and the recovery key that is used to encrypt the keybag). One of ordinary skill in the art would recognize that the modules shown in FIG. 7 are specific to creating and backing up confidential information of a user device of some embodiments and that the user device of some embodiments includes numerous additional modules, which are not shown in this figure.

As shown, the user device 700 includes the following modules: keychain generator 760, recovery key generator 765, keybag encryptor 775, recovery object generator 780, escrow key generator 788, escrow object generator 785, keychain backup 796, and local storage 799. The recovery key generator module 765 generates the recovery key 720 and stores (as shown by encircled 1) the key in local storage 799. In some embodiments, the recovery key generator module creates and stores the recovery key in the user device local storage 799 during the system setup of device 700. In some embodiments, the recovery key stored in the user device storage is further encrypted to protect the recovery key from unauthorized access.

As shown in FIG. 7, the keychain generator module 760 receives (as shown by encircled 2) the confidential information items 794 from the user 797 of the device 700. The keychain generator module 760 receives (as shown by encircled 3) keychain encryption keys (e.g., item keys and/or class keys) and encrypts the confidential information items 794, stores them in the corresponding keychains 705, and saves the encrypted keychain (as shown by encircled 4) in local storage 799. In some embodiments, the keychain encryption keys stored in the user device storage are further encrypted to protect the keys from unauthorized access.

Figure 8:
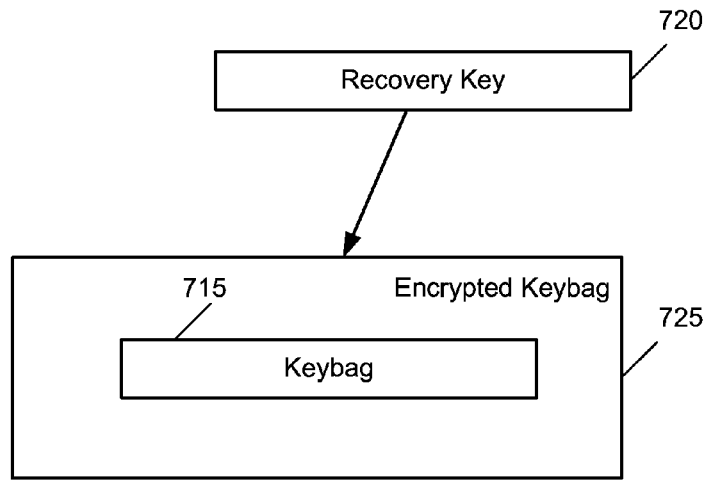
FIG. 8 conceptually illustrates the keybag which is encrypted by the recovery key to create the encrypted keybag in some embodiments of the invention.

Keychain backup module 796 receives (as shown by encircled 5) the encrypted keychain 705. The encrypted keychain 705 is sent (as shown by encircled 6) to the network 750 and is saved in the network storage 755. The keybag encryptor module 775 uses (as shown by encircled 7) the recovery key 720 and encrypts the keybag 715. The encrypted keybag 725 is sent (as shown by encircled 8) to network 750 for storage in network storage 755. FIG. 8 conceptually illustrates the keybag 715 which is encrypted by the recovery key 720 to create the encrypted keybag 725 in some embodiments of the invention.

Escrow key generator 788 generates the escrow key 730 based on a set of user-dependent information items 795 (as shown by encircled 9) such as username, password, and answer to one or more secret questions (e.g., mother's maiden name, the name of an elementary school friend, name of the first pet, etc.). Escrow key generator 788 then creates the escrow key based on one for more of these user-dependent information items. The escrow key is either passed (as shown by encircled 10) to the recovery object generator module 780 or is stored in the local storage for use by the recovery object generator module. Recovery object generator 780 receives the escrow key 730 from escrow key generator module 788 (or from local storage) and encrypts the recovery key (as shown by encircled 11) to generate the recovery object (or recovery blob) 735. The recovery object is sent (as shown by encircled 12) to escrow blob generator module 785.

Figure 9:
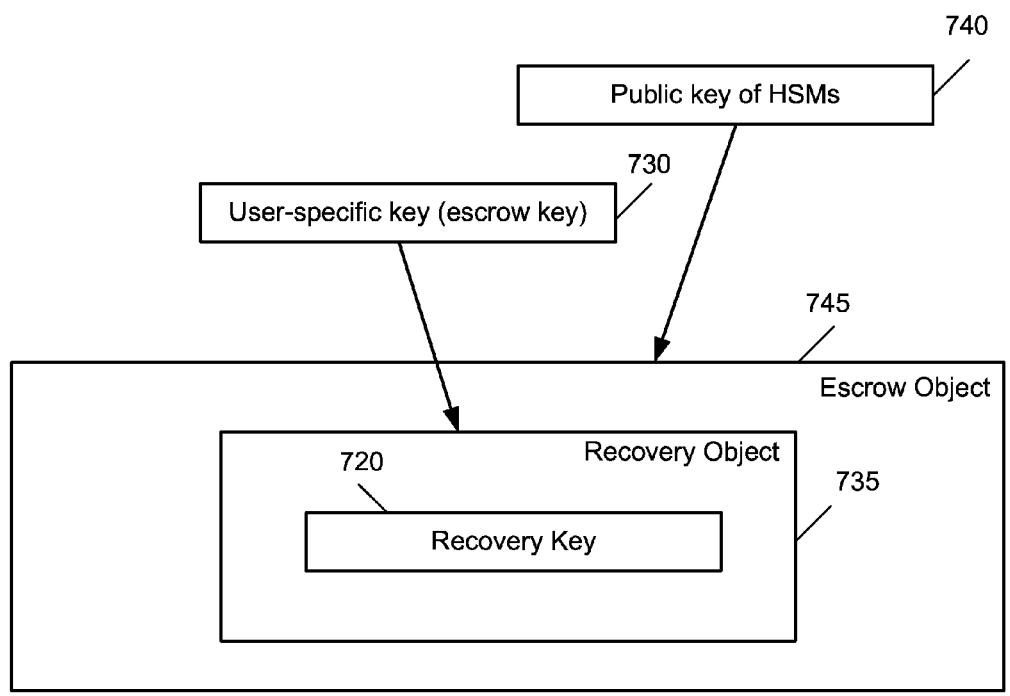
FIG. 9 conceptually illustrates the recovery key which is encrypted by the escrow key to create the recovery object which is in turn encrypted by the public key of the HSMs to create the escrow object in some embodiments of the invention.

Escrow blob generator module 785 receives (as shown by encircled 14) the public key 740 of the secure escrow service 790. The public key is received (as shown by encircled 13) by a trusted entity 792 from the secure escrow service 790 and is distributed to user devices. Escrow blob generator module 785 encrypts the recovery object by using the public key 740 to create the escrow object (or escrow blob) 745. The escrow blob 745 is sent (as shown by encircled 15) to the network 750 and is saved in the network storage 755. FIG. 9 conceptually illustrates the recovery key 720 which is encrypted by the escrow key 730 to create the recovery object 735 which is in turn encrypted by the public key 740 of the HSMs to create the escrow object 745 in some embodiments of the invention.

III. Storing Confidential Information of a Device in Network Storage

Figure 10:
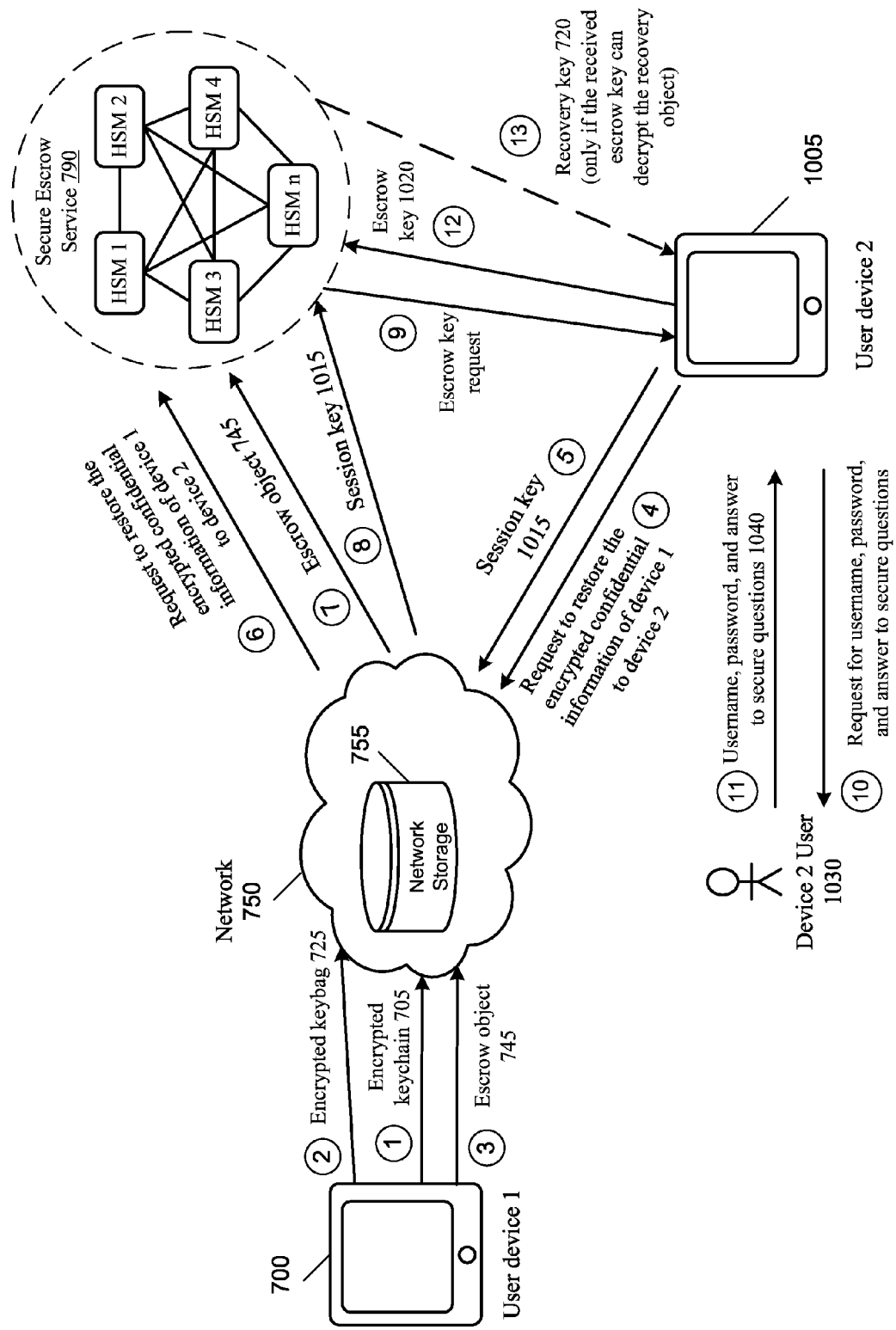
FIG. 10 conceptually illustrates a system for receiving the escrow object from a user device, storing the escrow object, and retrieving the recovery key encrypted by the escrow object to another user device in some embodiments of the invention.

FIG. 10 conceptually illustrates a system for receiving the escrow object from a user device, storing the escrow object, and retrieving the recovery key encrypted by the escrow object to another user device in some embodiments of the invention. As shown, user device 1 700 sends (as shown by encircled 1-3) the encrypted keychain 705, the encrypted keybag 725, and the escrow object 745 to network 750 for storing in the network storage 755. As described by reference to FIG. 7, the keybag is encrypted with the recovery key 720 and the escrow object encrypts the recovery key.

At a subsequent time, user device 2 1005 sends (as shown by encircled 4) a request for the confidential information (e.g., keychain and/or keybag) of user device 1 700. In some embodiments, user device 2 1005 also generates and sends (as shown by encircled 5) a session key 1015 in order to encrypt communications for retrieving the recovery blob.

The network 750 sends (as shown by encircled 6-8) the request for the confidential information, the escrow object 745, and the session key 1015 to secure escrow service 790 which ensures the authenticity of user device 2 1005. The secure escrow service first ensures that the code running in the set of servers has not changed since the public key 740 (shown in FIG. 7) and a matching private key were generated. If the code has changed, the secure escrow service servers are prevented from using the private key to decrypt the escrow object 745. The details of ensuring that the code has not changed are described further below. In some embodiments, the session key is sent securely to the HSMs. For example, the session key may be encrypted to the public key of the HSM.

If the code running on the secure escrow service servers has not changed, secure escrow service 790 decrypts the escrow object by using the private key to get the recovery object 735. Secure escrow service 790 then sends (as shown by encircled 9) a request to user device 2 1005 for the escrow key. User device 2 1005 sends (as shown by encircled 10) a request to the user 1030 of user device 2 to provide username, password, and answer to secure questions that are required to generate the escrow key. The user device then generates an escrow key 1020 based on the username, password, and answers provided by the user 1030 (as shown by encircled 11). User device 2 sends (as shown by encircled 12) the generated escrow key 1020 to secure escrow service.

If the escrow key received by the secure escrow service 790 cannot decrypt the recovery blob, the secure escrow service in some embodiments allows a predetermined number of retries. If the user succeeds in providing the right answers and a valid escrow key is generated, the number of attempted retries is reset to zero. Otherwise, when the number of successive failed retries reaches the predetermined number, the escrow record is irrevocably locked to the user device 2 in some embodiments. In other embodiments, the secure escrow sets a geometrically increasing timeout. After the expiration of the timeout, the secure escrow service sends another request for the escrow key to user device 2. In some embodiments, the user would initiate sending the request for the escrow key, and the attempt to retry would only progress if enough time had elapsed since the last try.

If the escrow key was able to decrypt the recovery blob (i.e., user 1030 had successfully provided username, password, and answer to secret questions), the secure escrow service decrypts the recovery object to get the recovery key 720. The secure escrow service then encrypts the recovery key with the session key 720 and sends (as shown by encircled 13) it to user device 2 1005. After being successfully authenticated, user device 2 separately receives (not shown) the keybag and keychain of user device 1 and uses the recovery key to decrypt the keybag. The class keys in the keybag are used in turn to recover the keychain of user device 1 700 to user device 2 1005.

In an alternative embodiment, the network 750 receives the set of passwords and other user dependent information 795 that was used by user device 1 to create the escrow key 730 (shown in FIG. 7) from user device 1. In these embodiments, the network sends this information to the secure escrow service and the secure escrow service requests and receives the same information (i.e., the passwords and other user dependent information) from user device 2. If the information received from user device 2 matches the information received from the network, the secure escrow service concludes that user device 2 is legitimate and sends the recovery object (the recovery key encrypted by the escrow key) to user device 2. User device 2 creates the escrow key, as described above, and decrypts the recovery object to get the recovery key.

Figure 11:
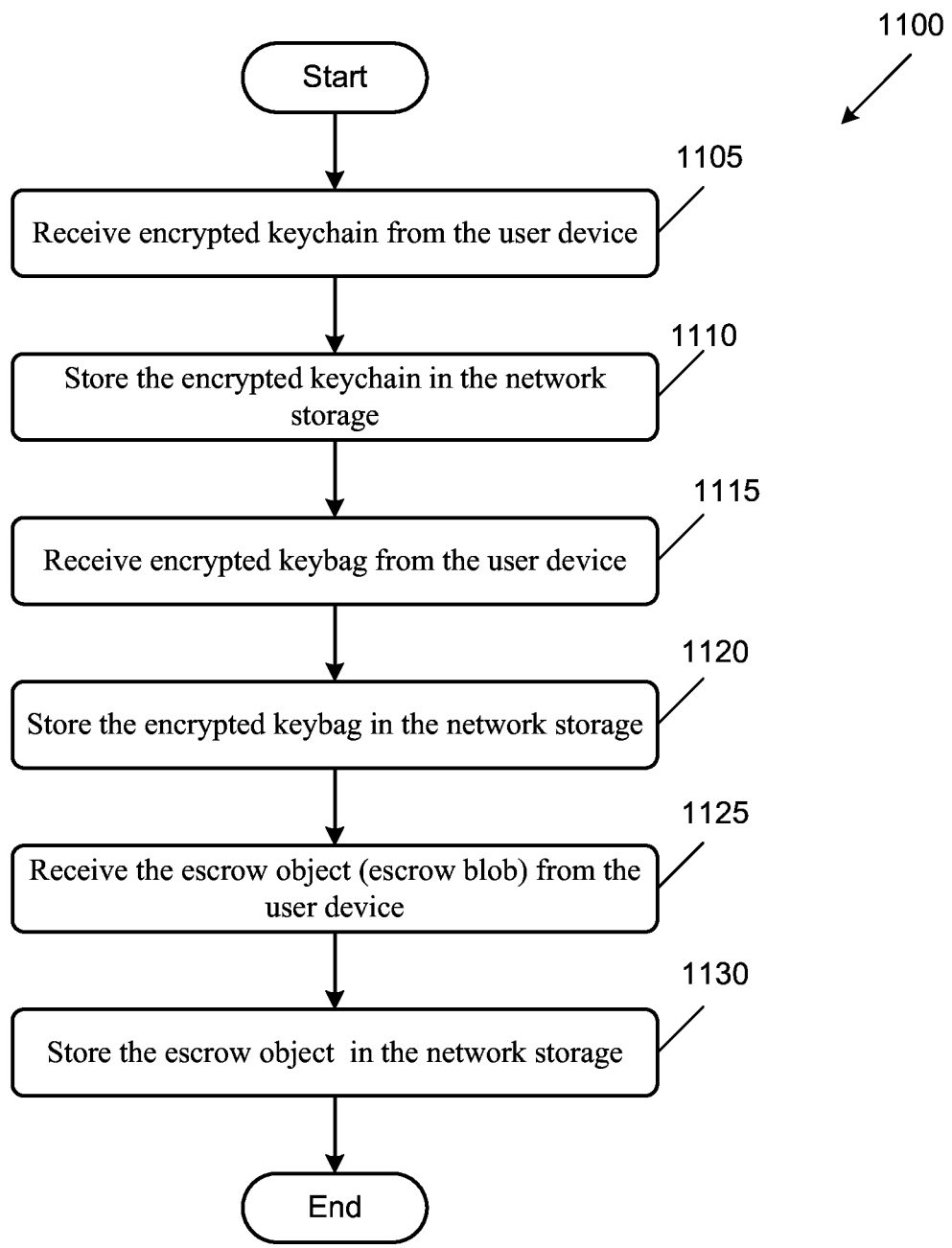
FIG. 11 conceptually illustrates a process that a network uses to store the confidential information of a user device in some embodiments of the invention.

FIG. 11 conceptually illustrates a process 1100 that a network uses to store the confidential information of a user device in some embodiments of the invention. As shown, the process receives (at 1105) the encrypted keychain and stores (at 1110) the encrypted keychain in the network storage.

The process then receives (at 1115) the encrypted keybag and stores (at 1120) the encrypted keybag in the network storage 755. The process then receives (at 1120) the escrow object and stores (at 1125) the escrow object in the network storage 755. The process then exits.

IV. Storing Confidential Information of a First Device and Retrieving the Confidential Information for a Second Device A. Generation of Public and Private Key Pair by Secure Escrow Service FIG. 12 conceptually illustrates a process 1200 for creating a public and private key pair by the secure escrow service in some embodiments of the invention. As shown, the process creates (at 1205) a public and private key pair. Secure escrow service in some embodiments provides strong encryption by generating public and private keys that are 256 bits or more. Some embodiments utilize an asymmetric key pair (e.g., an elliptic curve asymmetric 256 bits or more key pair). In some embodiments, the public and private key lengths are scalable to provide adequate security as more computing power becomes available to compromise encrypted data by brute force attaches. This ensures that even if a user's username and password for accessing the network storage is compromised and the escrow object is retrieved, the escrow object is encrypted by the strong public key and an intruder will not be able to readily decrypt the escrow object. The public key is known by the public while the private key is kept secret at the secure escrow service.

The process then sends (at 1210) the public key to a trusted entity for distribution to user devices. The process also calculates (at 1215) the hash of the executable code that is currently running on the HSMs. The process then includes the calculated hash in an access control list (ACL) and associates the ACL with the private key. Including the calculated hash in the ACL guarantees that in future only the HSMs with the same executable hash can access the private key to decrypt the escrow blobs. The process then stores (at 1225) the private key and the associated ACL in the local storage of the secure escrow service. The process then exits.

Some embodiments perform variations on the process 1200. The specific operations may not be performed in one continuous series of operations, and different specific operations may be performed in different embodiments. For instance, the process of some embodiments sends the public key to a trusted entity for distribution to user devices after storing the private key and the associated ACL in the local storage of the secure escrow service.

B. Ensuring that HSM Executable Code has not Changed Since Generation of the Private Key FIG. 13 conceptually illustrates different modules of the secure escrow service 790 for generating the public and private key pair in some embodiments of the invention. As shown, secure escrow service 790 includes a public and private key generator system 1305 that includes several modules 1310-1320 for generating the public and private key pair. Secure escrow service also includes storage 1325 for storing the private key.

As shown, asymmetric key generator module 1310 creates private key 1330 and the corresponding public key 740. Asymmetric key generator module 1310 sends (as shown by encircled 1) the public key 740 to a trusted entity 792 for distribution (as shown by encircled 2) to user devices such as user device 1 700.

Hash generator module 1320 accesses (as shown by encircled 3) the executable code 1350 of the HSMs and generates hash 1327 of HSM's executable code. Access control list (ACL) generator module 1315 receives the private key 1330 (as shown by encircled 4) and the hash 1325 (as shown by encircled 5) and includes the hash of the HSM's executable code in an ACL and associates the ACL with the private key. Access control list (ACL) generator module 1315 stores (as shown by encircled 6) the private key and the corresponding ACL 1340 in the secure escrow service storage 1325.

Some embodiments perform variations on the process 1200. The specific operations may not be performed in one continuous series of operations, and different specific operations may be performed in different embodiments. For instance, the process of some embodiments sends the public key to the trust entity after the ACLs are all setup.

Figure 14:
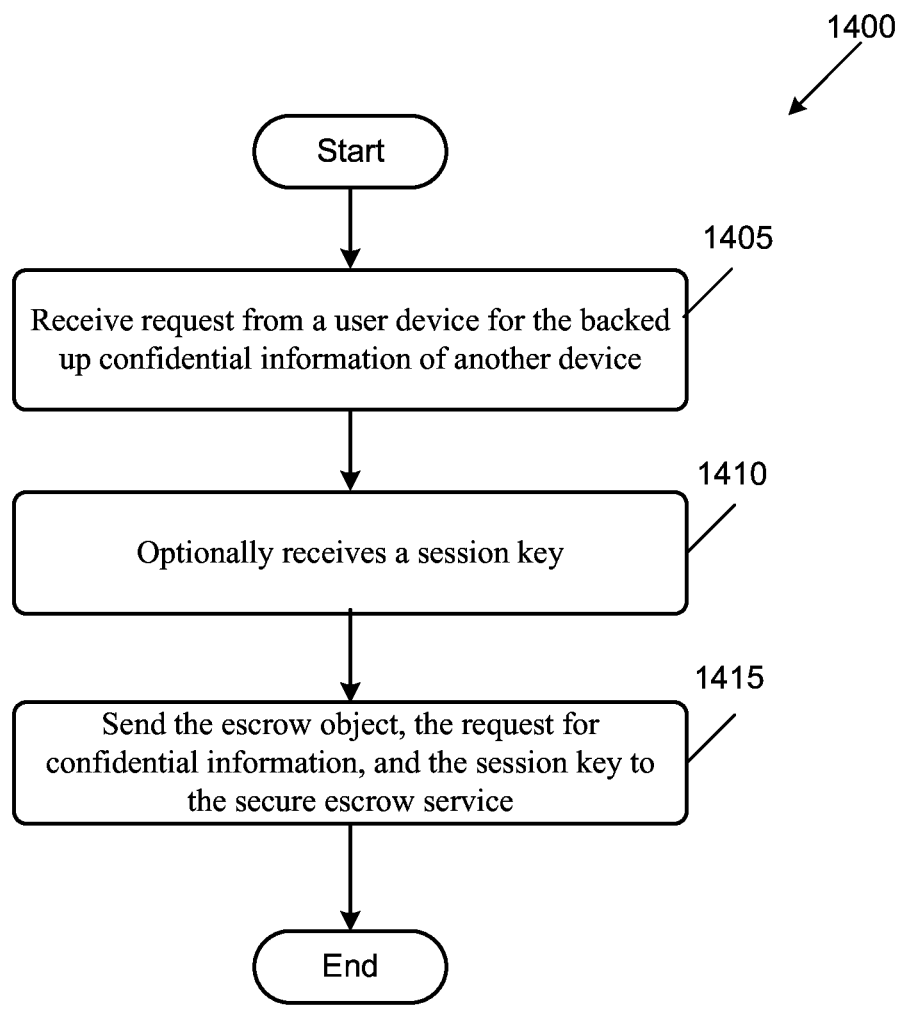
FIG. 14 conceptually illustrates a process for a network that stores escrow blob to receive a request from a user device for retrieving the backed up confidential information of another user device.

FIG. 14 conceptually illustrates a process 1400 for a network that stores escrow blob to receive a request from a user device for retrieving the backed up confidential information of another user device. As shown, the process receives (at 1400) a request from a user device to retrieve the backed up confidential information (e.g., keychain and/or keybag) of another user device. The request includes an identification of the requesting device and the identification of the device whose confidential information is requested. The process optionally receives (at 1410) a session key to encrypt communication regarding the confidential information.

The process then sends (at 1415) the escrow object, the request for the confidential information, and the session key to the secure escrow service to process the request. The process then ends.

Figure 15:
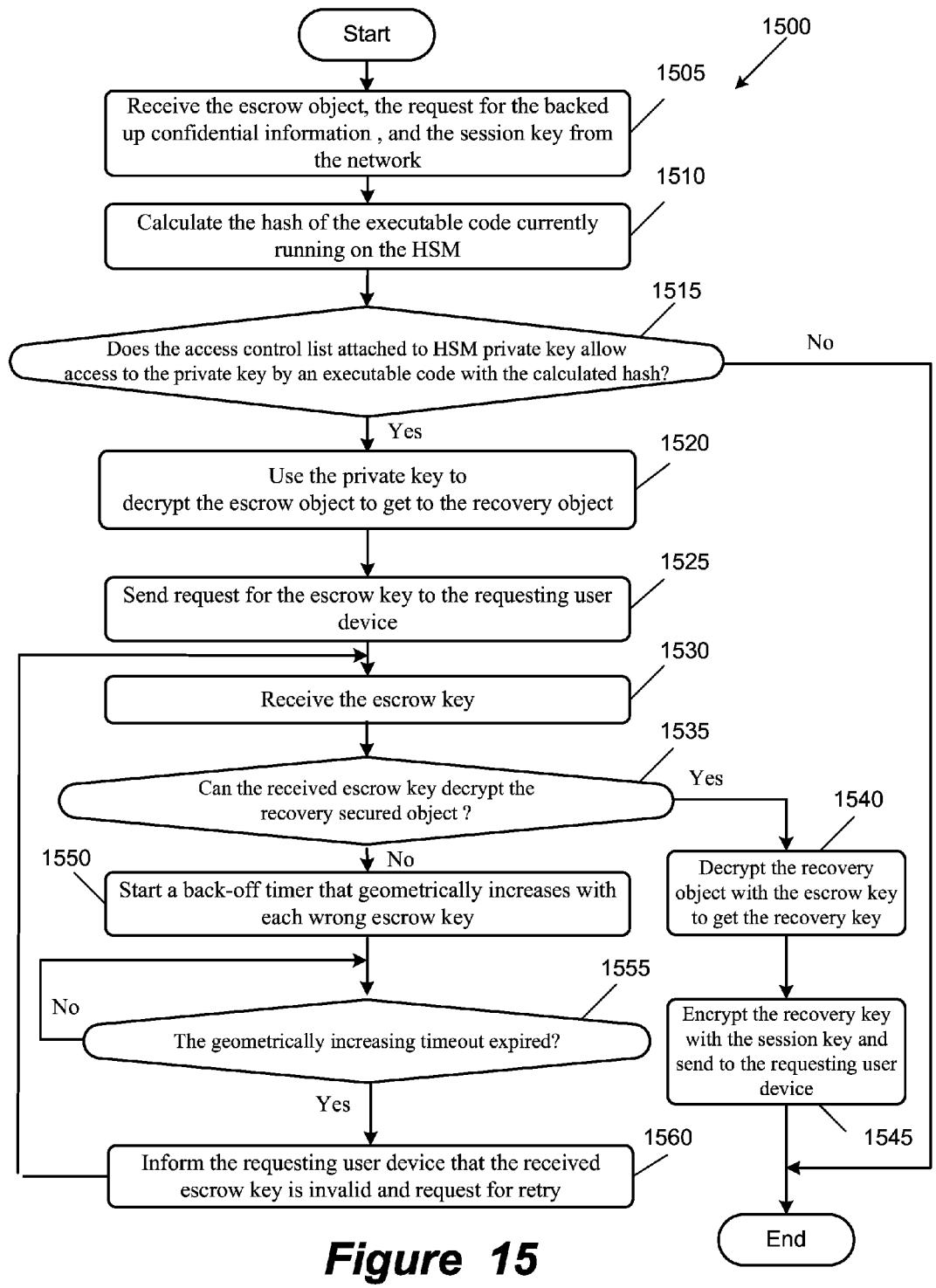
FIG. 15 conceptually illustrates a process for providing the recovery key of a user device to a different user device.

FIG. 15 conceptually illustrates a process 1500 for providing the recovery key of a user device to a different user device. As shown, the process receives (at 1505) the escrow object, the request for the backed up confidential information, and the optional session key from the network (e.g., when user device 2 1005 in FIG. 10 sends the request for the confidential information of user device 1 700 to the network 750 and the network forwards the request to secure escrow service 790 along with the escrow object).

The process then calculates (1510) the hash of the executable code that is currently running on the HSMs. The process then determines (at 1515) whether the access control list attached to HSM private key allows access to the private key by an executable code with the calculated hash. If not, the process exits without allowing the access to the private key. In some embodiments the executable code of the HSM is signed with a code signing key. The code is cryptographically hashed and signed by the code signing key. When the private key is generated, the ACL that is attached to the private key is a pointer to the code signing key. The private key can only be used if the code that is currently executing on the HSM was signed by the same code signing key. The secure escrow service is therefore prevented from decrypting the escrow blob if the executable code of the HSMs has changed since the private key and the associated ACL were generated.

When the private key can be accessed, the process uses (at 1520) the private key to decrypt the escrow object (or the escrow blob) to get to the recovery object (or the recovery blob) which includes the recovery key encrypted by the escrow key.

The process then sends a request to the user device that is requesting the confidential information to generate and provide the escrow key. In some embodiments, all communications between process 1500 (which is performed by the secure escrow service) and the user device that is requesting the keychain are encrypted by the session key that is received from the user device through the network. The process then receives (at 1525) the escrow key.

The process then determines (at 1535) whether the received escrow key can decrypt the recovery object. The received escrow key can only decrypt the recovery object if the username, password, and answer to secret questions provided by the user 1030 of user device 2 1005 (shown in FIG. 10) matches the username, password, and answer to secret questions provided by the user 797 of user device 1 700 (shown in FIG. 7) resulting in the same key as the escrow key 730 that was used to encrypt the recovery object.

If the received escrow key can decrypt (at 1540) the recovery secured object, the process decrypts the recovery object with the escrow key to get the recovery key. The process then encrypts the recovery key with the session key and sends (at 1545) the recovery key to the requesting device. The requesting device can use (as described by reference to FIG. 10) the recovery key to decrypt the encrypted keybag. The process then exits.

If the received escrow key cannot decrypt the recovery secured object, the process starts (at 1550) a back-off timer that geometrically increases with each wrong escrow key. The back-off timer ensures that after a few wrong attempts, the time out becomes so long that it becomes infeasible for a malicious user device to attempt to get the correct escrow key to the secure escrow service by brute force trial. The process then determines (at 1555) whether the time out is expired. If not, the process returns to 1555 and waits for the time out to expire. Otherwise, the process informs (at 1560) the requesting user device that the received escrow key is invalid and requests another escrow key. The process then proceeds to 1530 which was described above.

Some embodiments perform variations on the process 1500. The specific operations may not be performed in one continuous series of operations, and different specific operations may be performed in different embodiments. For instance, in some embodiments, the user initiates sending the request for the escrow key, and the attempt to retry would only progress if enough time had elapsed since the last try. This might cause the timer expiration check operation to occur just prior to operation 1525. That is, if retry timer has elapsed, then the process 1500 proceeds to operation 1525; otherwise, the process ends.

As described by reference to FIG. 10 above, in an alternative embodiment the network receives the set of passwords and other user dependent information that was used by user device 1 to create the escrow key 730 (shown in FIG. 7) from user device 1. In these embodiments, process 1500 receives this information from the network and requests and receives the same information (i.e., the passwords and other user dependent information) from user device 2. If the information received from user device 2 matches the information received from the network, process 1500 concludes that user device 2 is legitimate and sends the recovery object (the recovery key encrypted by the escrow key) to the requesting user device. User device 2 creates the escrow key and decrypts the recovery object to get the recovery key.

Yet in other alternative embodiments, instead of utilizing a geometrically increasing timeout (at 1550 and 1555), process 1500 utilizes a retry count. In these embodiments, before a first attempt by the user of the device that is requesting the confidential information to answer the questions, the retry count is set to zero. Each time the user provides wrong answers resulting in an escrow key that cannot decrypt the recovery secured object (at 1535), the retry count is incremented by one. Each time the user provides correct answers and the resulting escrow key can decrypt the recovery secured object, the retry count is reset to zero. If the retry count reaches a predetermined number (e.g., 3, 5, 10, 20, etc.), the recovery secured object becomes irrevocably locked. Any further attempt by the requesting user device to retrieve the recovery key is denied.

Figure 16:
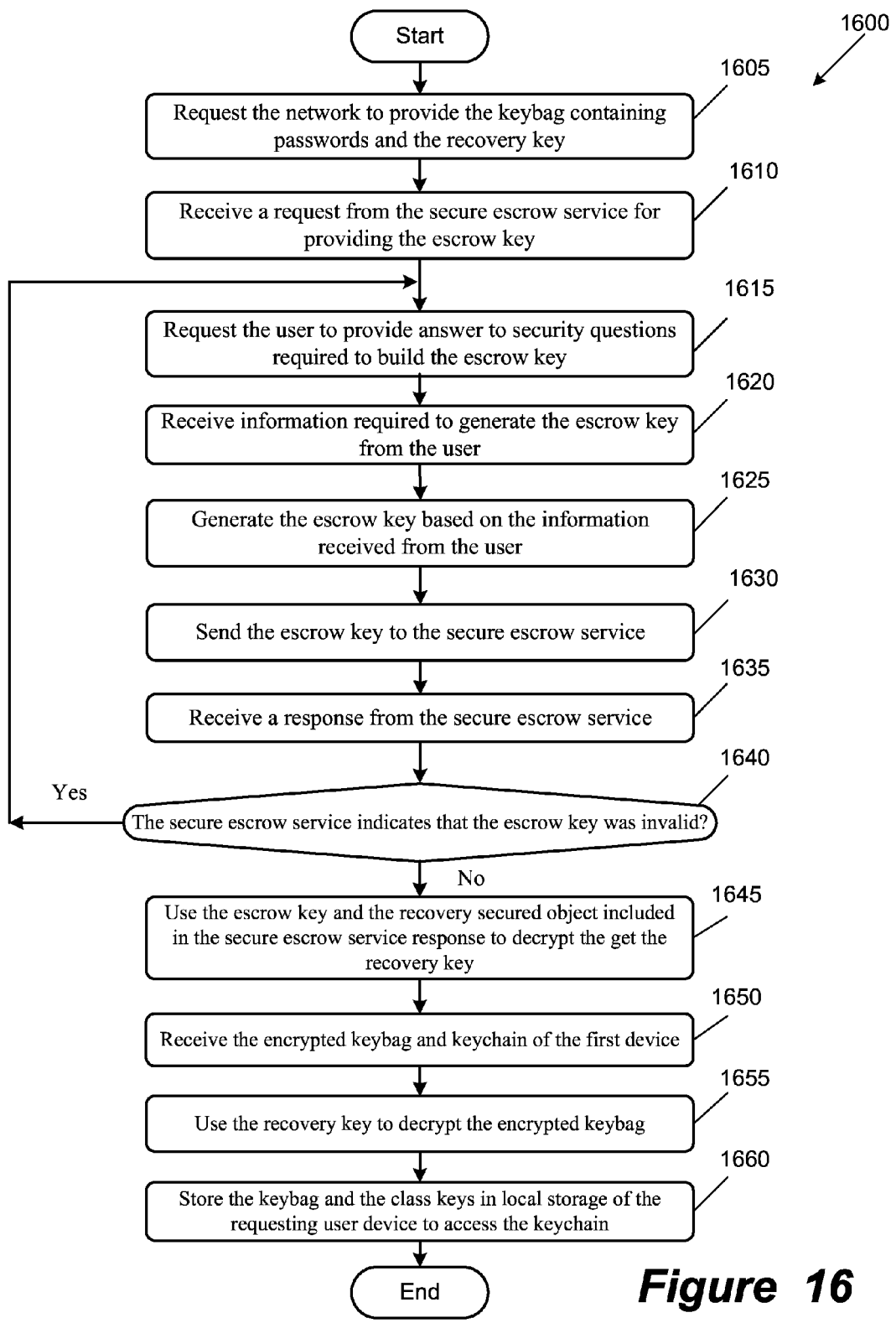
FIG. 16 conceptually illustrates a process for requesting and receiving the backed up keychain and keybag of a user device by a different user device.

FIG. 16 conceptually illustrates a process 1600 for requesting and receiving the backed up keychain and keybag of a user device by a different user device. In some embodiments, this process is performed by user device 2 shown in FIG. 10. As shown, the process requests (at 1605) the network to provide the keychain (or the encrypted keybag and the recovery key) of a first user device that was backed up in the network storage to a second user device. The process then receives (at 1610) a request from the secure escrow service to provide the escrow key (e.g., after the secure escrow service 790 receives the request through the network 750 in FIG. 10).

The process then requests (at 1615) the user of the requesting device (i.e., the second device) to provide the username, password, and answer to secret questions that are required to generate the escrow key. The process then receives (at 1620) the information required to generate the escrow key from the user of the requesting device. The process then generates (at 1625) the escrow key based on the received information. The process sends (at 1630) the generated escrow key to the secure escrow service.

The process then receives (at 1635) a response from the secure escrow service. The process then determines (at 1640) whether the secure escrow service indicates that the escrow key was invalid. If so, the process proceeds to 1615 to request the user to re-enter the information required to generate the escrow key. Otherwise, the process uses (at 1645) the escrow key to decrypt the recovery object included in the secure escrow service response to get the recovery key.

The process then receives (at 1650) the encrypted keybag and keychain of the first user device. The process then uses (at 1655) the recovery key to decrypt the encrypted keybag to get the class keys. The process then stores (at 1660) the keybag and the class keys in local storage of the requesting user device. The keybag and the class keys are used to access the confidential information in the keychain when an information item in the keychain is required by the user device. The process then exits.

Figure 17:
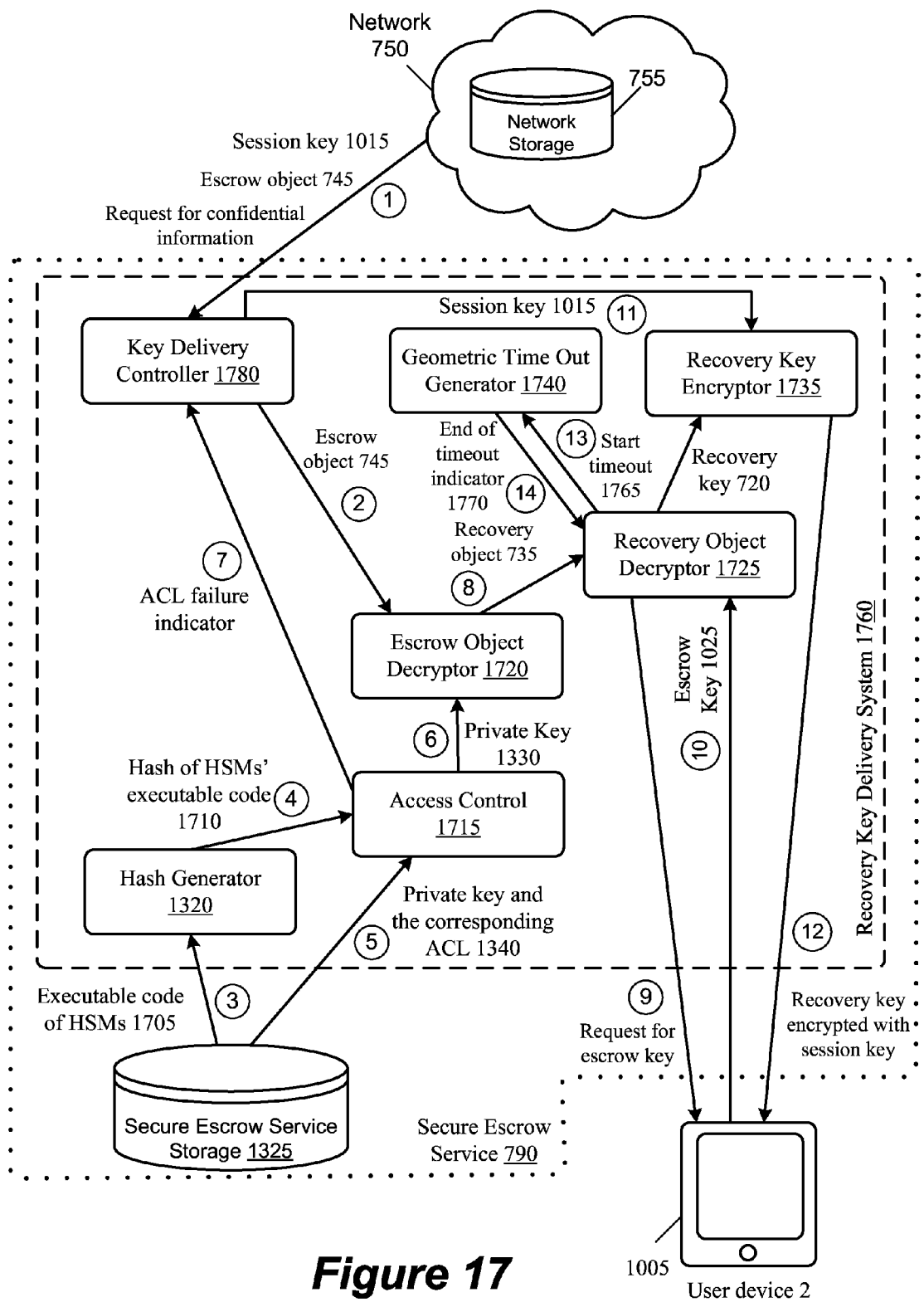
FIG. 17 conceptually illustrates the recovery key delivery system of the secure escrow service in some embodiments of the invention.

FIG. 17 conceptually illustrates the recovery key delivery system of the secure escrow service in some embodiments of the invention. As shown, the secure escrow service 790 includes recovery key delivery system 1760 and storage 1325. Recovery key delivery system 1760 includes Key delivery controller module 1780, geometric time out generator module 1740, recovery key encryptor module 1735, recovery object decryptor module 1725, escrow object decryptor module 1720, access control module 1715, and hash generator module 1320 (the same or similar module as the hash generator module used by public and private key generator 1305 system in FIG. 13).

Key delivery controller module 1780 receives (as shown by encircled 1) the request 1010 for confidential information, escrow object 745, and the optional session key 1015 from the network 750 (as shown in FIG. 10). Key delivery controller module 1780 sends (as shown by encircled 2) the escrow object 745 to escrow object decryptor module 1720 for decryption. Escrow object decryptor module 1720 requires access to the private key 1330 stored in the secure escrow service storage 1325. In order for the private key to be accessible, hash generator module 1320 calculates the hash 1710 of the executable code (as shown by encircled 3) that is currently running on the HSMs.

Figure 13:
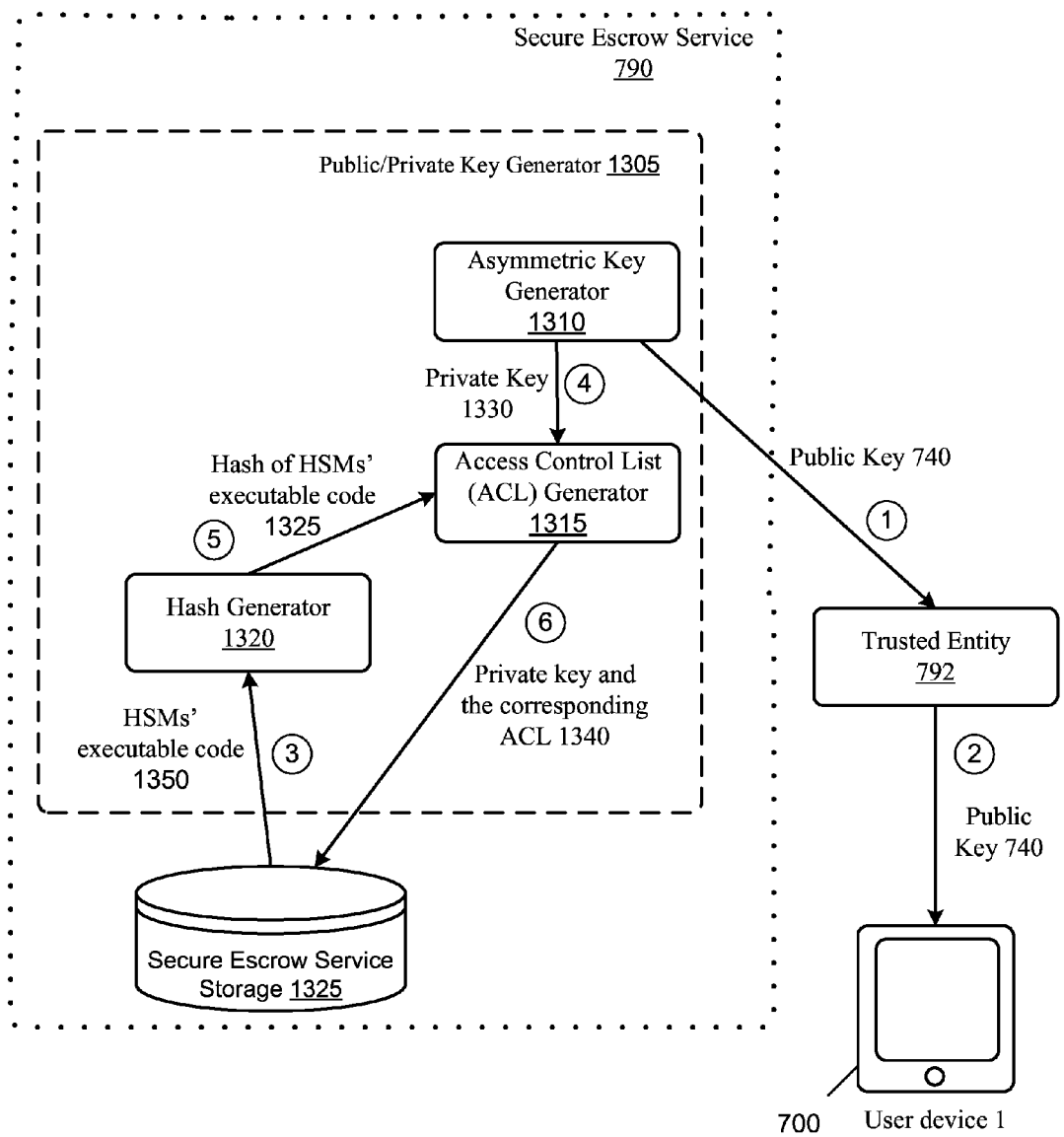
FIG. 13 conceptually illustrates different modules of the secure escrow service for generating the public and private key pair in some embodiments of the invention.

The hash is passed (as shown by encircled 4) to access control module 1715 which determines whether ACL associated with the private key allows access to the private key by the code currently running on the HSMs. The access to the private key is only possible when the hash of the executable code 1705 currently running on HSMs matches the hash 1325 calculated on the HSMs executable code 1350 (as shown in FIG. 13) when the private key was generated. If the private key is accessible (i.e. when the HSM code was not changed and the two hash values match), access control module 1715 accesses the private key (as shown by encircled 5) and sends (as shown by encircled 6) the private key 1330 to the escrow object decryptor module 1720. If the private key is not accessible, access control module 1715 sends (as shown by encircled 7) a failure indicator to key delivery controller module 1780.

Escrow object decryptor module 1720 decrypts the escrow object 745 using the private key 1330 to get the recovery object 735. The recovery object is passed (as shown by encircled 8) to recovery object decryptor module 1725. Recovery object decryptor module 1725 sends (as shown by encircled 9) a request to the requesting user device (user device 2 1005) to provide the escrow key. The recovery object decryptor module 1725 receives (as shown by encircled 10) the escrow key 1025 from user device 2 1005. If the received escrow key can decrypt the recovery object (which happens only when the received escrow key 1025 is the same as the escrow key 730 generated by user device 1 700 shown in FIG.

7), recovery object decryptor module 1725 sends the recovery key 720 to recovery key encryptor module 1735. Recovery key encryptor module 1735 uses the session key 1015 received (as shown by encircled 11) from key delivery controller 1780 to encrypt the recovery key with the session key. Recovery key encryptor module 1735 then sends (as shown by encircled 12) the recovery key encrypted with the session key to user device 2 1005.

If the received escrow key cannot decrypt the recovery object, recovery object decryptor module 1725 sends (as shown by encircled 13) a start timeout request 1765 to geometric time out generator module 1740 to start a timeout that geometrically increases after the receipt of each invalid escrow key. When recovery object decryptor module 1725 receives (as shown by encircled 14) an end of timeout indicator 1770 from geometric time out generator module 1740, recovery object decryptor module 1725 sends another request (as shown by encircled 8) for the escrow key to the user device 2. After several tries, if the received escrow key is still invalid, the timeout becomes so large that it becomes impractical for an intruder to try to send every possible escrow key to secure escrow service 790.

In some alternative embodiments, recovery key delivery system of FIG. 17 utilizes a retry count instead of a geometrically increasing timeout. These embodiments include a retry controller module instead of the geometric time out generator module 1740. If the received escrow key cannot decrypt the recovery object, recovery object decryptor module 1725 sends a retry failure indication to retry controller module. On the other hand, if the received escrow key can decrypt the recovery object, recovery object decryptor module 1725 sends a retry count reset request to retry controller module. The retry controller module initially sets the retry count to 0 (before any attempts by user device 2 to retrieve the confidential information). The retry controller module increments the retry count upon receiving each failure indication and resets the retry count to 0 upon the receipt of the retry count reset request. When the retry count reaches a predetermined number, the retry controller module irrevocably locks the confidential information resulting to any further attempts by user device 2 to retrieve the information to fail.

Figure 18:
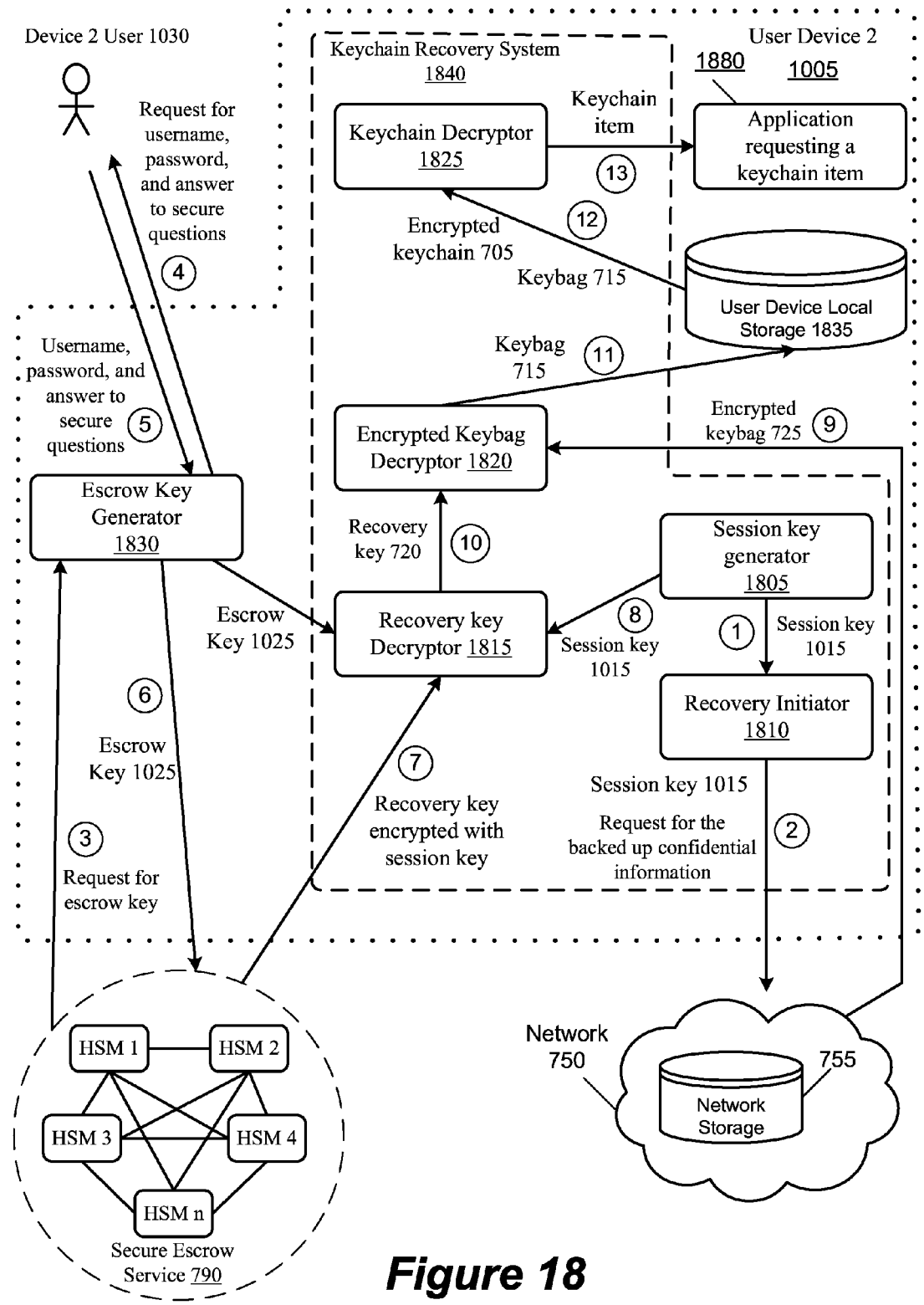
FIG. 18 conceptually illustrates a keychain/keybag recovery system of a user device in some embodiments of the invention.

FIG. 18 conceptually illustrates a keychain/keybag recovery system 1840 of a user device 1030 in some embodiments of the invention. This user device is requesting to get the backed up keychain and/or keybag of another user device. As shown, the user device 1005 includes keychain recovery system 1840, escrow key generator module 1830, and storage 1835. Keychain recovery system 1840 includes session key generator module 1805, recovery initiator module 1810, recovery key decryptor module 1815, encrypted keybag decryptor module 1820, and keychain decryptor module 1825.

Recovery initiator module 1810 initiates the request to network 750 (e.g., after receiving a request from the user 1030 or an automatic request from an application that is attempting to restore the keychain of another user device to user device 1005). The user might have owned another user device which is lost, stolen, or is being replaced and wants to restore the backed up copy of the user's previous device keychain into the user's new device. Alternatively, user 1030 might be an intruder that is attempting to get access to the keychain of another user's device in order to gain access to the other user's confidential information.

Recovery initiator module 1810 optionally receives (as shown by encircled 1) a session key 1015 from session key generator module 1805 in order to encrypt communications with the network 750 and secure escrow service 790. Recovery initiator module 1810 sends (as shown by encircled 2) a request for the backed up confidential information (i.e., the keychain and/or keybag) along with the session key 1015 to the network 750. As described by reference to FIGS. 10 and 17, network 750 forwards the request, the escrow object stored in network storage 755, and the session key 1015 to secure escrow service 790 (interactions between the network and the secure escrow service are not shown in FIG. 18).

Escrow key generator module 1830 receives (as shown by encircled 3) a request 1020 for escrow key from the secure escrow service. As described above, secure escrow service requires the escrow key in order to decrypt the recovery object to determine whether user device 2 1005 is authorized to access the keychain of another user device. Also, as described above, secure escrow service can only access the private key and decrypt the escrow object to get the recovery object if the executable code of HSMs has not changed since the private key 1330 (shown in FIGS. 13 and 17) was generated.

Escrow key generator module 1830 requests (as shown by encircled 4) the user 1030 of user device 2 1005 to provide confidential information such as username, password, and answer to secret questions. Escrow key generator module 1830 generates an escrow key 1025 based on the received information from the user 1030 (as shown by encircled 5) and sends (as shown by encircled 6) the generated escrow key 1025 to secure escrow service 790. As described by reference to FIGS. 17 and 7 above, if this information is the same as the information entered by user 797 of user device 1 700 when the escrow key 730 was generated, secure escrow service can decrypt the recovery object 735. Matching of the two escrow keys authenticates user device 2 since the user 1030 of user device 2 1005 has access to the same secret information as the user 797 of user device 1 700.

When the escrow key 1025 received from escrow key generator 1830 is invalid, after a geometrically increasing timeout, secure escrow service sends another request (as shown by encircled 3) for the escrow key to escrow key generator module 1830. Otherwise, when the escrow key 1025 received from escrow key generator 1830 is valid, secure escrow service 790 sends (as shown by encircled 7) the recovery key encrypted by the session key to recovery key decryptor module 1815. As described above, in some alternative embodiments, the secure escrow service 790 allows a predetermined number of retries instead of using a geometrically increasing time. In these embodiments, when the received escrow key is invalid, the secure escrow service sends another request for the escrow key to escrow key generator module in the number of successive failed retries has not reached a predetermined number. Otherwise, the escrowed information (i.e., the recovery key) is irrevocably locked.

Recovery key decryptor module 1815 receives (as shown by encircled 8) session key from session key generator module 1805 and decrypts the encrypted recovery key to get the recovery key 720. Encrypted keybag decryptor module 1815 receives the keybag encrypted with the recovery key (as shown by encircled 9) and uses the recovery key 720 (as shown by encircled 10) to decrypt the encrypted keybag to get the keybag 715 and the class keys 712.

Encrypted keybag decryptor 1820 stores (as shown by encircled 11) the keybag 715 in the user device local storage 1835. Upon successful authentication of user device 2, the encrypted keychain 705 is also received from the network and stored in user device local storage 1835. Whenever an item in the keychain is needed by an application 1880 (application 1880 can be either internal to the user device or an external application), keychain decryptor module 1825 receives the encrypted keychain 705 (as shown by encircled 12) and uses the class keys in the keybag to access the chain items. The relevant keychain item is then sent (as shown by encircled 13) to the requesting application 1880.

V. Ensuring the Secure Escrow Servers are not Compromised

As described above, each time a user device that is requesting access to the confidential information of another device fails to provide a valid escrow key, the secure escrow service starts a geometrically increasing timeout to make it increasingly time consuming to try different values for escrow key (e.g., when an intruder uses brute force trying of all possible different values for the escrow key. In alternative embodiments, the secure escrow service only allows a predetermined number of retries. However, there is still the possibility of duplicating HSM servers and trying different values of the escrow key with each group of HSMs. This option, although very expensive, allows an entity (such as a foreign government where a group of HSMs are operating) to provide (or obligate the operator of HSMs to provide) many copies of the HSMs in order to try to find the correct escrow key by brute force. Each group of HSMs is retired after their geometric timeout become prohibitively long (or the number of successive failed retries reaches the predetermined number) and another group is used to continue trying different escrow key values.

Some embodiments provide a method for preventing the HSMs to be duplicated. In these embodiments each group (or a pod) of HSMs work together. Each pod is assigned to service a particular set of user devices. In these embodiments, requests from a particular user device are always sent to a particular pod of HSMs and all other HSM pods reject any request from that user device.

In some embodiments, the HSMs in a pod all execute the same executable code. The HSMs in a pod generate a common key that they all recognize and tie that key to the hash of the executable code of the HSMs when the key is generated. The HSMs in the pod also agree to a maximum number of HSMs that can be simultaneously active in the pod. If the number of HSMs in the pod exceeds the agreed upon number, the HSMs will not process device requests anymore. For instance, after a predetermine amount of time, each HSM in the pod contacts the other HSMs in the pod to determine whether the number of HSMs in the pod has exceeded the maximum. In some embodiments, if an HSM is unable to contact the other HSMs in the pod for a predetermined amount of time, the HSM marks itself as offline and stops processing requests from the devices in order to prevent many individual HSMs to be used to do a brute force attack. In these embodiments, the working HSMs in the pod has to exceed one in order to process requests from the devices.

In order to allow regular maintenance of HSMs in a pod, each pod allows a fewer number of HSMs in the pod as well as replacing an HSM with another HSM as long as the total number of active HSMs do not exceed the predetermined (or agreed upon) number and all HSMs execute the same code with the hash value that is tied to the common key.

In the example described above, one mechanism to limit the number of HSMs in the pod is to periodically check if there are too many members. In some embodiments, an HSM has to explicitly request to join a pod, and the HSM will only be admitted if the current operational count is below the max. At that point, the newly joining HSM receives a copy of the key needed to work on the collection of escrow objects belonging to the pod. New HSMs can join when there are vacancies. Vacancies are formed when a previous HSM falls out of communication with a majority of members of the pod after some timeout. In addition, any minority grouping of pods automatically stops processing requests and exits the pod if they cannot establish communication with a majority of pod members after a similar timeout. Some embodiments provide a hysteresis between the two timeout values to deal with race conditions. The timeout for an HSM to autonomously stop servicing requests is lower than the timeout for the majority of members to declare a vacancy, in some embodiments.

Figure 19:
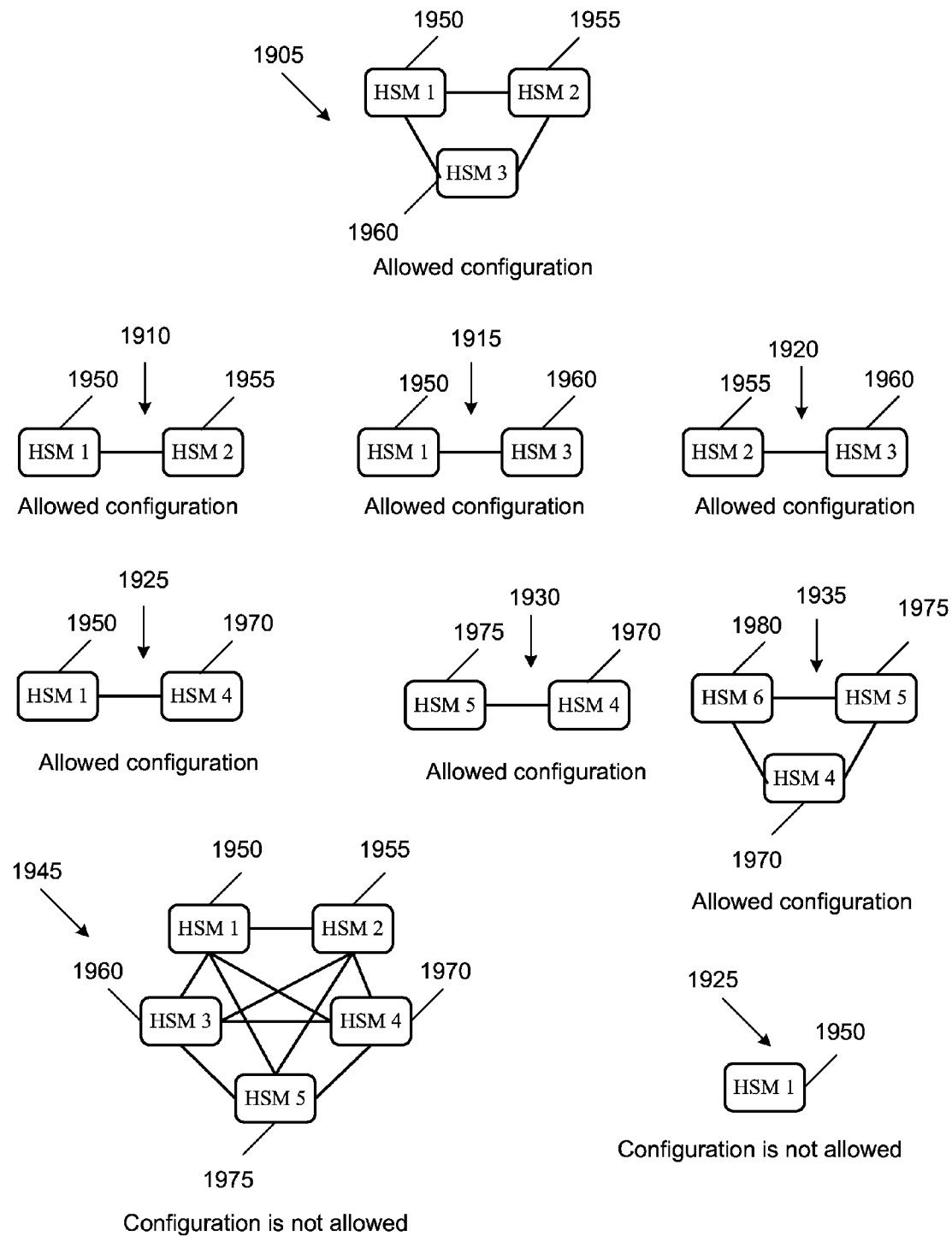
FIG. 19 conceptually illustrates examples of valid and invalid configurations for a pod HSMs with maximum of three allowed HSMs in some embodiments of the invention.

FIG. 19 conceptually illustrates examples of valid and invalid configurations for a pod HSMs with maximum of three allowed HSMs in some embodiments of the invention. As shown, valid configurations include any configuration of two or three HSMs. The valid combinations include all three HSMs 1950-1960 (configuration 1905) and any combination of two of the three HSMs 1950-1960 in the pod (configurations 1910-1920). In addition, any combination (such as configurations 1925-1935) where one, two, or all three HSMs 1950-1960 are replaced by other HSMs is acceptable as long as the maximum number does not exceed three and the new HSMs execute the same code as the original HSMs in the pod (i.e. the code that generates the same hash value that is tied to the common key of the HSMs).

On the other hand, configuration 1945 is invalid because it includes five HSMs (1950-1975) which exceeds the maximum number of allowed HSMs in the pod. Also, configuration 1925 that includes only one HSM is not allowed in order to prevent individual HSMs to continue processing device requests (if the HSMs are allowed to work alone, then unlimited number of HSM can be added to do a brute force attempt to try different escrow keys to decrypt the recovery object).

Figure 20:
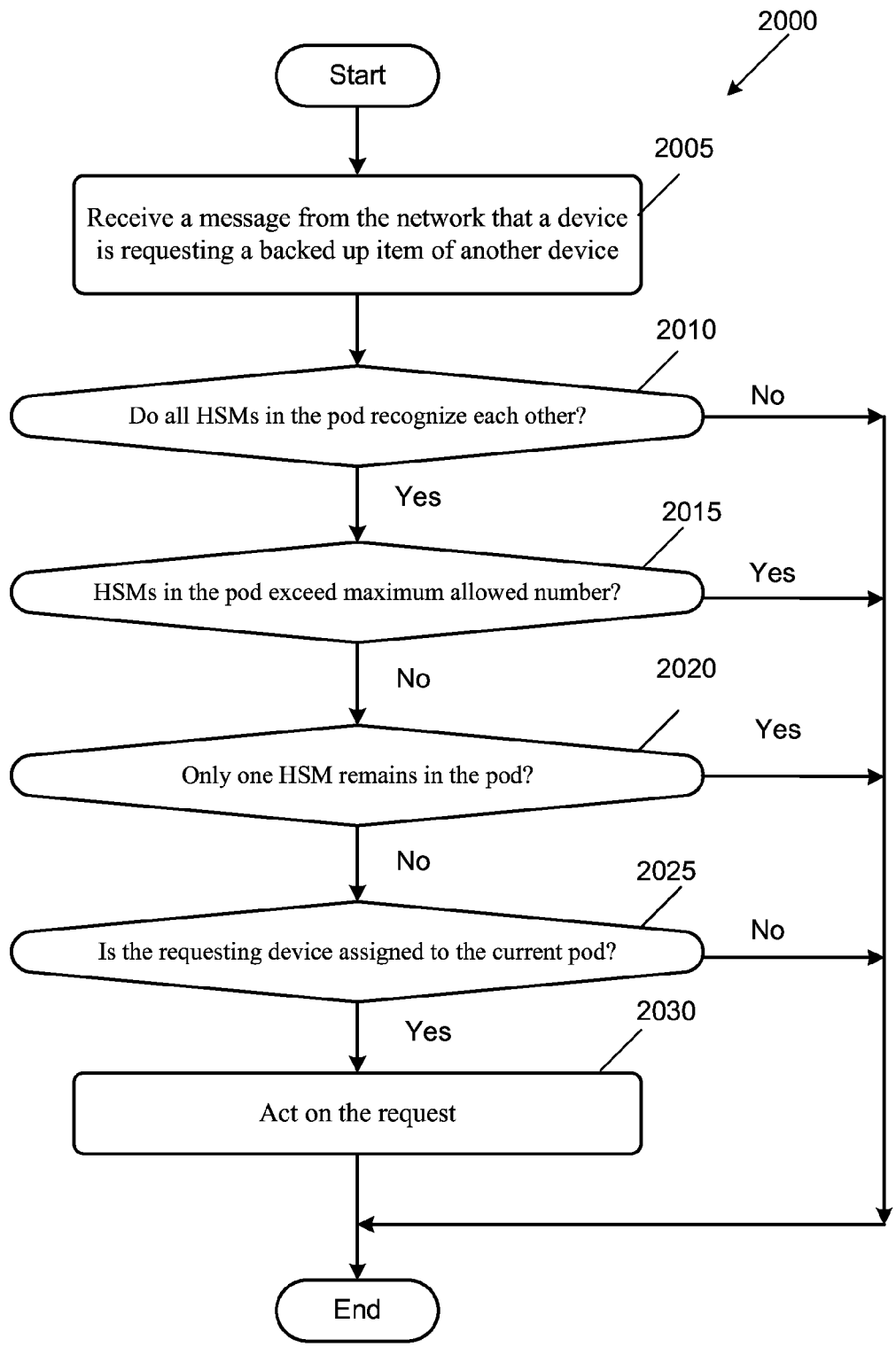
FIG. 20 conceptually illustrates a process for determining whether an HSM pod can process a request from a user device.

FIG. 20 conceptually illustrates a process 2000 for determining whether an HSM pod can process a request from a device. As shown, the process receives (at 2005) a message from the network that a device is requesting a backed up item of another user device.

The process then determines (at 2010) whether all HSMs in the pod recognize each other. For instance, the hash of the code in each HSM is the same, which allows for the HSMs common key to be accessible. If not, the process exits without acting on the device request. In other words, the HSM do not act on a request if they do recognize all HSMs in the pod. When all HSMs in the pod recognize each other, the process determines (at 2015) whether HSMs in the pod exceed maximum allowed number. If yes, the process exits without acting on the device request.

When the maximum allowed number of HSMs is not exceeded, the process determines (at 2020) whether there is only one HSM remains in the pod. If yes, the process exits without acting on the device request. Otherwise, the process determines (at 2025) whether the requesting device is assigned to the current pod. If not, the process exits without acting on the user device request. Otherwise, the process acts (at 2030) on the request (e.g., by running process 1500). After processing the request, the process exits.

In the example described above, the process determines whether there is only one HSM remaining in the pod. In some embodiments, the process determines whether there is a minority number of HSMs. For example, any time an individual HSM finds it can only establish contact with a minority number of members (including itself) it may not process the request.

Although different techniques such as operating the HSMs in pods that do not exceed a maximum, using a common key between the HSMs that is tied to the hash of their executable code, assigning each user device to a particular HSM pod, etc., are described by reference to processing a request to restore the recovery key, the techniques are not limited to this particular application. The same techniques are applicable to any application where there is a need to protect a key or any other confidential information, a need to prevent duplication of servers or a need to ensure that a set of servers does not exceed a maximum number.

Furthermore, there are applications where confidential information such as a key, a binary image, any other information has to be dispersed to one device only. However, it is desirable to store multiple copies of the confidential information in different severs to provide redundancy. In these applications, the servers have to be prevented to disperse the information to multiple devices. An example is a subscriber identity module or subscriber identification module (SIM) card that is used in a mobile phone. A SIM card has to be used by only one device in order to prevent using the airtime of a user by another user.

Instead of using a physical SIM card, some embodiments store SIM card information of a mobile device in a network storage and deliver the information to the mobile device upon request. In order to provide redundancy, the SIM card information is stored in multiple HSMs. The HSMs are aware of each other's state. When a request to deliver a SIM card is received by a particular server in the pod, the receiving server informs the other servers in the pod that the request is being processed by that particular server. Other servers acknowledge and ignore any requests to deliver the same SIM card information.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 21:
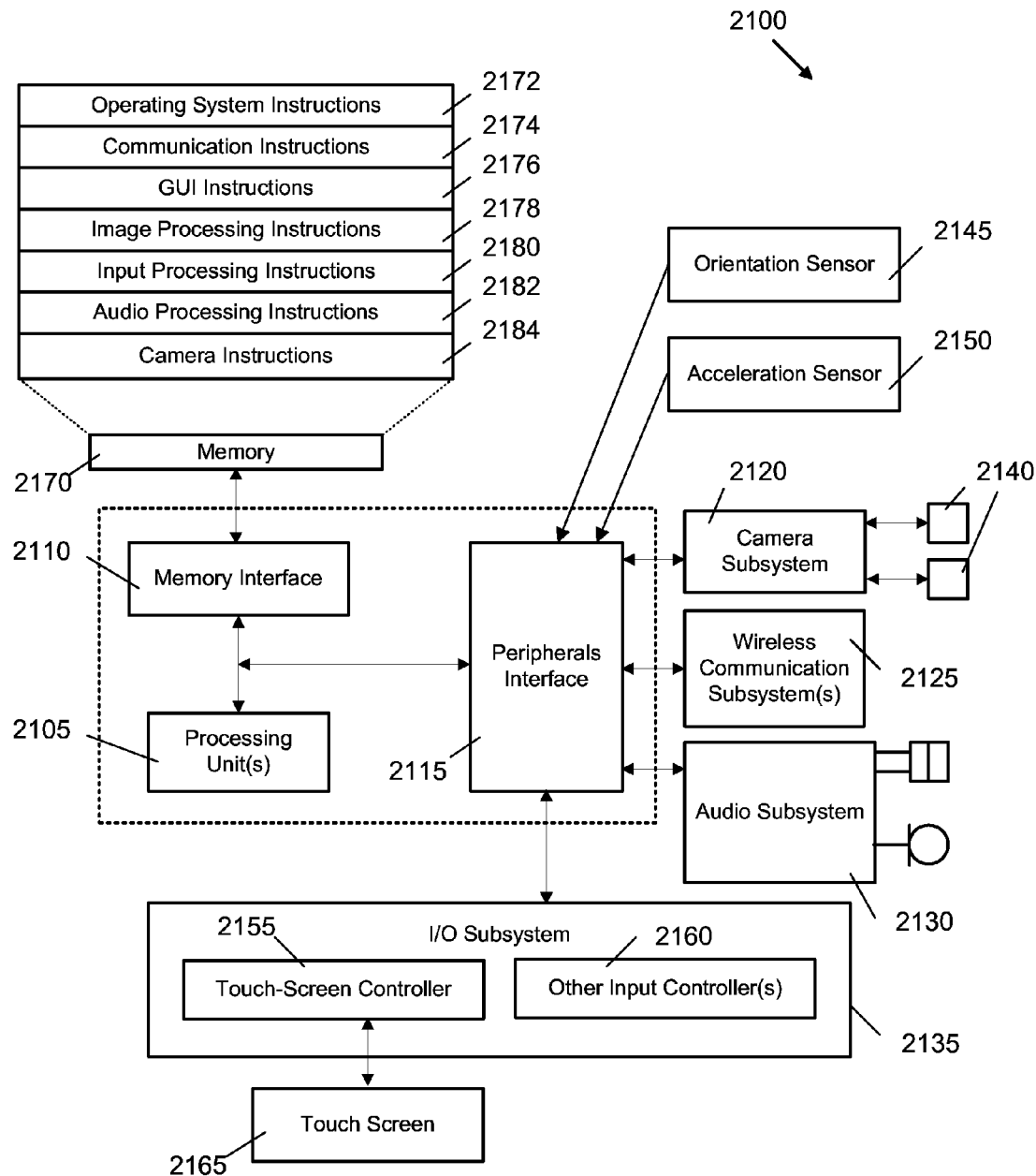
FIG. 21 is an example of an architecture of such a mobile computing device in some embodiments of the invention.

The keychain backup and restoration applications of some embodiments operate on mobile devices, such as smart phones (e.g., iPhones®) and tablets (e.g., iPads®). FIG. 21 is an example of an architecture 2100 of such a mobile computing device. Examples of mobile computing devices include smartphones, tablets, laptops, etc. As shown, the mobile computing device 2100 includes one or more processing units 2105, a memory interface 2110 and a peripherals interface 2115.

The peripherals interface 2115 is coupled to various sensors and subsystems, including a camera subsystem 2120, a wireless communication subsystem(s) 2125, an audio subsystem 2130, an I/O subsystem 2135, etc. The peripherals interface 2115 enables communication between the processing units 2105 and various peripherals. For example, an orientation sensor 2145 (e.g., a gyroscope) and an acceleration sensor 2150 (e.g., an accelerometer) are coupled to the peripherals interface 2115 to facilitate orientation and acceleration functions.

The camera subsystem 2120 is coupled to one or more optical sensors 2140 (e.g., a charged coupled device (CCD) optical sensor, a complementary metal-oxide-semiconductor (CMOS) optical sensor, etc.). The camera subsystem 2120 coupled with the optical sensors 2140 facilitates camera functions, such as image and/or video data capturing. The wireless communication subsystem 2125 serves to facilitate communication functions. In some embodiments, the wireless communication subsystem 2125 includes radio frequency receivers and transmitters, and optical receivers and transmitters (not shown in FIG. 21). These receivers and transmitters of some embodiments are implemented to operate over one or more communication networks such as a GSM network, a Wi-Fi network, a Bluetooth network, etc. The audio subsystem 2130 is coupled to a speaker to output audio (e.g., to output user-specific questions for generating the escrow key). Additionally, the audio subsystem 2130 is coupled to a microphone to facilitate voice-enabled functions, such as voice recognition (e.g., for searching), digital recording, etc.

The I/O subsystem 2135 involves the transfer between input/output peripheral devices, such as a display, a touch screen, etc., and the data bus of the processing units 2105 through the peripherals interface 2115. The I/O subsystem 2135 includes a touch-screen controller 2155 and other input controllers 2160 to facilitate the transfer between input/output peripheral devices and the data bus of the processing units 2105. As shown, the touch-screen controller 2155 is coupled to a touch screen 2165. The touch-screen controller 2155 detects contact and movement on the touch screen 2165 using any of multiple touch sensitivity technologies. The other input controllers 2160 are coupled to other input/control devices, such as one or more buttons. Some embodiments include a near-touch sensitive screen and a corresponding controller that can detect near-touch interactions instead of or in addition to touch interactions.

The memory interface 2110 is coupled to memory 2170. In some embodiments, the memory 2170 includes volatile memory (e.g., high-speed random access memory), non-volatile memory (e.g., flash memory), a combination of volatile and non-volatile memory, and/or any other type of memory. As illustrated in FIG. 21, the memory 2170 stores an operating system (OS) 2172. The OS 2172 includes instructions for handling basic system services and for performing hardware dependent tasks.

The memory 2170 also includes communication instructions 2174 to facilitate communicating with one or more additional devices; graphical user interface instructions 2176 to facilitate graphic user interface processing; image processing instructions 2178 to facilitate image-related processing and functions; input processing instructions 2180 to facilitate input-related (e.g., touch input) processes and functions; audio processing instructions 2182 to facilitate audio-related processes and functions; and camera instructions 2184 to facilitate camera-related processes and functions. The instructions described above are merely exemplary and the memory 2170 includes additional and/or other instructions in some embodiments. For instance, the memory for a smartphone may include phone instructions to facilitate phone-related processes and functions. Additionally, the memory may include instructions for a keychain backup or restoration application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 21 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 21 may be split into two or more integrated circuits.

B. Computer System

Figure 22:
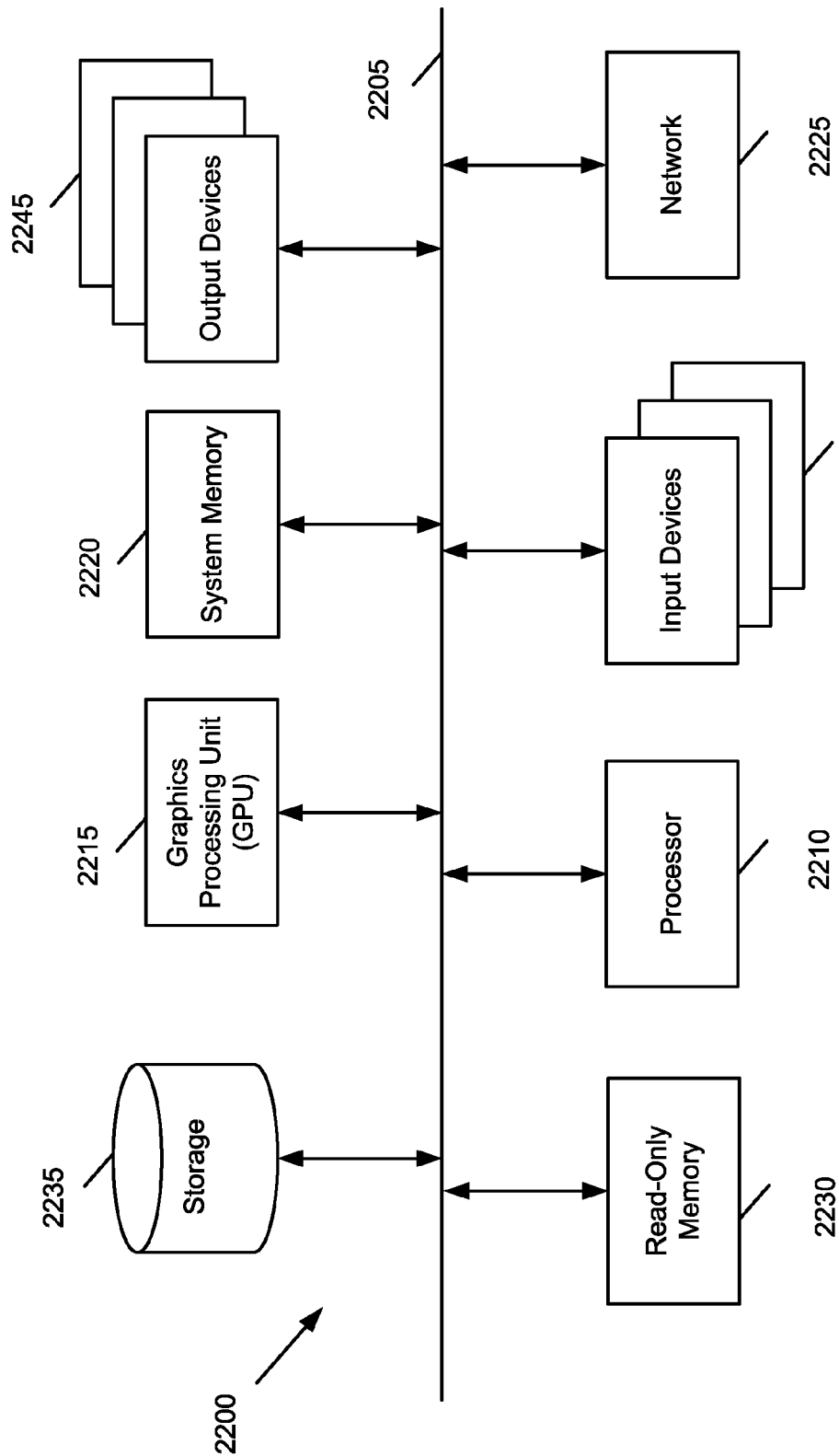
FIG. 22 conceptually illustrates an electronic system with which some embodiments of the invention are implemented.

FIG. 22 conceptually illustrates an electronic system 2200 with which some embodiments of the invention are implemented. The electronic system 2200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2200 includes a bus 2205, processing unit(s) 2210, a graphics processing unit (GPU) 2215, a system memory 2220, a network 2225, a read-only memory 2230, a permanent storage device 2235, input devices 2240, and output devices 2245.

The bus 2205 collectively represents all system, peripheral, and chip set buses that communicatively connect the numerous internal devices of the electronic system 2200. For instance, the bus 2205 communicatively connects the processing unit(s) 2210 with the read-only memory 2230, the GPU 2215, the system memory 2220, and the permanent storage device 2235.

From these various memory units, the processing unit(s) 2210 retrieves instructions to execute and data to process in order to execute the processes of the invention. The processing unit(s) may be a single processor or a multi-core processor in different embodiments. Some instructions are passed to and executed by the GPU 2215. The GPU 2215 can offload various computations or complement the image processing provided by the processing unit(s) 2210. In some embodiments, such functionality can be provided using CoreImage's kernel shading language.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash memory device, etc., and its corresponding disk drive) as the permanent storage device. Like the permanent storage device 2235, the system memory 2220 is a read-and-write memory device. However, unlike storage device 2235, the system memory 2220 is a volatile read-and-write memory, such as a random access memory. The system memory 2220 stores some of the instructions and data that the processor needs at runtime. In some embodiments, the invention's processes are stored in the system memory 2220, the permanent storage device 2235, and/or the read-only memory 2230. For example, the various memory units include instructions for processing multimedia clips in accordance with some embodiments. From these various memory units, the processing unit(s) 2210 retrieves instructions to execute and data to process in order to execute the processes of some embodiments.

The bus 2205 also connects to the input and output devices 2240 and 2245. The input devices 2240 enable the user to communicate information and select commands to the electronic system. The input devices 2240 include alphanumeric keyboards and pointing devices (also called "cursor control devices"), cameras (e.g., webcams), microphones or similar devices for receiving voice commands, etc. The output devices 2245 display images generated by the electronic system or otherwise output data. The output devices 2245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 22, bus 2205 also couples electronic system 2200 to a network 2225 through a network adapter (not shown). In this manner, the computer can be a part of a network of computers (such as a local area network ("LAN"), a wide area network ("WAN"), or an Intranet), or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 6, 11, 12, 14-16, and 20) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of accessing a recovery key to decrypt confidential data of a device, the method comprising:
   storing a private key and an associated access control list on a set of servers, the access control list storing a hash value of executable code running on the set of servers at a time of generating the private key;
   receiving a request at the set of servers to access the recovery key, the request comprising a secure object comprising the recovery key, the secure object encrypted with a public key corresponding to said private key; and
   decrypting the secure object using the private key to access the secure object comprising the recovery key, the private key accessible only when a hash value of the executable code running on the set of servers at a time of accessing the private key matches the hash of the executable code running on the set of servers at the time of generating the private key.

2. The method of claim 1 further comprising:
   generating a common key recognizable by all servers in the set of servers;
   associating an access control to the common key, the access control allowing access to the common key only to executable code having a same hash value as a hash value of the executable code running on the set of servers at a time of generating the common key; and
   ignoring a request to access a recovery key of a device when a hash value of the executable code running on the set of servers at the time of receiving the request does not match the hash value of the executable code running on the set of servers at the time of generating the common key.

3. The method of claim 1 further comprising:
   setting a maximum number for the servers in the set of servers; and
   ignoring a request to access a recovery key of a device when a number of servers in the set of servers exceeds the maximum number.

4. The method of claim 1, wherein the confidential data comprises a set of class keys encrypting a set of passwords.

5. The method of claim 1, wherein the confidential data comprises a set of passwords, wherein each password in the set of passwords is associated with a class key, wherein the class keys are encrypted by the recovery key at the device.

6. The method of claim 1, wherein the recovery key is a device dependent key that is generated by the device.

7. The method of claim 1, wherein the device is a first device, wherein the secure object is sent by the first device to a network for storage, wherein the network sends the request to access the recovery key and the secure object to the set of servers after the network receives a request from a second device to restore the confidential data of the first device to the second device.

8. The method of claim 7, wherein the set of servers is a first set of servers in a plurality of sets of servers, the method further comprising:
   assigning each device in a plurality of devices to one set of servers in the plurality of sets of servers, the plurality of devices comprising the first and second devices, the assigning comprising assigning the first and second devices to the first set of servers;
   ignoring a request to restore the confidential data of the first device to the second device when the request is received by a set of servers other than the first set of servers; and
   processing the request to restore the confidential data of the first device to the second device when the request is received by the first set of servers.

9. A non-transitory computer readable medium storing a program for accessing a recovery key to decrypt confidential data of a device, the program executable by at least one processing unit in each server in a set of servers, the program comprising sets of instructions for:
   storing a private key and an associated access control list on the set of servers, the access control list storing a hash value of executable code running on the set of servers at a time of generating the private key;
   receiving a request to access the recovery key, the request comprising a secure object comprising the recovery key, the secure object encrypted with a public key corresponding to said private key; and
   decrypting the secure object using the private key to access the secure object comprising the recovery key, the private key accessible only when a hash value of the executable code running on the set of servers at a time of accessing the private key matches the hash of the executable code running on the set of servers at the time of generating the private key.

10. The non-transitory computer readable medium of claim 9, wherein the program further comprises sets of instructions for:
   generating a common key recognizable by all servers in the set of servers;
   associating an access control to the common key, the access control allowing access to the common key only to executable code having a same hash value as a hash value of the executable code running on the set of servers at a time of generating the common key; and
   ignoring a request to access a recovery key of a device when a hash value of the executable code running on the set of servers at the time of receiving the request does not match the hash value of the executable code running on the set of servers at the time of generating the common key.

11. The non-transitory computer readable medium of claim 9, wherein the program further comprises sets of instructions for:
  setting a maximum number for the servers in the set of servers; and
  ignoring a request to access a recovery key of a device when a number of servers in the set of servers exceeds the maximum number.

12. The non-transitory computer readable medium of claim 9, wherein the confidential data comprises a set of class keys encrypting a set of passwords.

13. The non-transitory computer readable medium of claim 9, wherein the confidential data comprises a set of passwords, wherein each password in the set of passwords is associated with a class key that is encrypted by the recovery key at the device.

14. The non-transitory computer readable medium of claim 9, wherein the recovery key is a device dependent key that is generated by the device.

15. The non-transitory computer readable medium of claim 9, wherein the device is a first device, wherein the recovery key comprised in the secure object is encrypted with a first user specific key, wherein the first user specific key is generated by the first device based on answers to a set of user specific questions, the program further comprising sets of instructions for:
  receiving a second user specific key from a second device requesting to access the confidential data of the first device, the second user-specific key generated based on the same set of user-specific questions used to generate the first user-specific key by the first device;
  decrypting the secure object with the second user-specific key to get the recovery key when the second user-specific key received from the second device matches the first user-specific key; and
  sending the recovery key to the second device after the second secure object is decrypted.

16. The non-transitory computer readable medium of claim 9, wherein the device is a first device, wherein the secure object is sent by the first device to a network for storage, wherein the network sends the request to access the recovery key and the secure object to the set of servers after the network receives a request from a second device to restore the confidential data of the first device to the second device.

17. The non-transitory computer readable medium of claim 16, wherein the set of servers is a first set of servers in a plurality of sets of servers, the program further comprising sets of instructions for:
  assigning each device in a plurality of devices to one set of servers in the plurality of sets of servers, the plurality of devices comprising the first and second devices, the assigning comprising assigning the first and second devices to the first set of servers;
  ignoring a request to restore the confidential data of the first device to the second device when the request is received by a set of servers other than the first set of servers; and
  processing the request to restore the confidential data of the first device to the second device when the request is received by the first set of servers.

18. The non-transitory computer readable medium of claim 15, wherein (i) encryption of the recovery key by the first user-specific key to create the secure object and (ii) encryption of the secure object by the public key are done by the device.

19. The non-transitory computer readable medium of claim 15, the program further comprising sets of instructions for:
  generating a progressively increasing timeout each time the second user-specific key received from the second device does not match the first user-specific key; and
  repeating said receiving the second user-specific key and said generating the progressively increasing timeout as long as the second user-specific key received from the second device does not match the first user-specific key.

20. The non-transitory computer readable medium of claim 15, the program further comprising sets of instructions for:
  repeating said receiving the second user-specific key for a number of consecutive tries when the second user-specific key received from the second device does not match the first user-specific key;
  irrevocably blocking access to the second secure object after the second user-specific key does not match the first user-specific key for a predetermined number of consecutive tries; and
  resetting the number of consecutive tries to zero when the second user-specific key received from the second device matches the first user-specific key before the number of consecutive tries reaches the predetermined threshold.

21. The non-transitory computer readable medium of claim 9, wherein the private key is not accessible when the hash value of the executable code running on the set of servers at the time of accessing the private key does not match the hash of the executable code running on the set of servers at the time of generating the private key.

22. The method of claim 1, wherein the device is a first device, wherein the recovery key comprised in the secure object is encrypted with a first user specific key, wherein the first user specific key is generated by the first device based on answers to a set of user specific questions, the method further comprising:
  at the set of servers, receiving a second user specific key from a second device requesting to access the confidential data of the first device, the second user-specific key generated based on the same set of user-specific questions used to generate the first user-specific key by the first device;
  decrypting the secure object with the second user-specific key to get the recovery key when the second user-specific key received from the second device matches the first user-specific key; and
  sending the recovery key to the second device after the second secure object is decrypted.

23. The method of claim 22, wherein (i) encryption of the recovery key by the first user-specific key to create the secure object and (ii) encryption of the secure object by the public key are done by the device.

24. The method of claim 22 further comprising:
  generating a progressively increasing timeout each time the second user-specific key received from the second device does not match the first user-specific key; and
  repeating said receiving the second user-specific key and said generating the progressively increasing timeout as long as the second user-specific key received from the second device does not match the first user-specific key.

25. The method of claim 22 further comprising:
  repeating said receiving the second user-specific key for a number of consecutive tries when the second user-specific key received from the second device does not match the first user-specific key;
  irrevocably blocking access to the second secure object after the second user-specific key does not match the first user-specific key for a predetermined number of consecutive tries; and resetting the number of consecutive tries to zero when the second user-specific key received from the second device matches the first user-specific key before the number of consecutive tries reaches the predetermined threshold.

26. The method of claim 1, wherein the private key is not accessible when the hash value of the executable code running on the set of servers at the time of accessing the private key does not match the hash of the executable code running on the set of servers at the time of generating the private key.

* * * * *